(12) United States Patent
Morishige et al.

(10) Patent No.: US 12,091,722 B2
(45) Date of Patent: Sep. 17, 2024

(54) METHOD FOR MANUFACTURING GRAIN-ORIENTED ELECTRICAL STEEL SHEET AND GRAIN-ORIENTED ELECTRICAL STEEL SHEET

(71) Applicant: NIPPON STEEL CORPORATION, Tokyo (JP)

(72) Inventors: Nobusato Morishige, Tokyo (JP); Ryutaro Yamagata, Tokyo (JP); Ichiro Tanaka, Tokyo (JP); Takashi Kataoka, Tokyo (JP); Haruhiko Atsumi, Tokyo (JP); Yoshihiro Suwa, Tokyo (JP); Kazumi Mizukami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 486 days.

(21) Appl. No.: 17/421,309

(22) PCT Filed: Jan. 8, 2020

(86) PCT No.: PCT/JP2020/000344
§ 371 (c)(1),
(2) Date: Jul. 7, 2021

(87) PCT Pub. No.: WO2020/145319
PCT Pub. Date: Jul. 16, 2020

(65) Prior Publication Data
US 2022/0002831 A1    Jan. 6, 2022

(30) Foreign Application Priority Data

Jan. 8, 2019 (JP) .................... 2019-001165

(51) Int. Cl.
C22C 38/00    (2006.01)
C21D 6/00    (2006.01)
(Continued)

(52) U.S. Cl.
CPC ............... C21D 9/46 (2013.01); C21D 6/005 (2013.01); C21D 6/008 (2013.01); C21D 8/005 (2013.01);
(Continued)

(58) Field of Classification Search
CPC ....... C22C 38/002; C22C 38/02; C22C 38/04; C22C 38/06; C22C 2202/02; H01F 1/147
(Continued)

(56) References Cited

U.S. PATENT DOCUMENTS 3,932,234 A    1/1976  Imanaka et al.
2009/0047537 A1    2/2009  Nanba et al.
(Continued)

FOREIGN PATENT DOCUMENTS

CN    108699620 A    10/2018
EP    2096185 A1 *    9/2009    ........... C21D 8/1266
(Continued)

Primary Examiner — Katherine A Christy
(74) Attorney, Agent, or Firm — Birch, Stewart, Kolasch & Birch, LLP

(57) ABSTRACT

Grain-oriented electrical steel sheet and its method of manufacture are provided. The method includes a process of heating to 1280° C. or more and hot rolling a slab containing, by mass %, Bi and a predetermined composition of constituents and having a balance of Fe and impurities to obtain hot rolled steel sheet. After hot rolling annealing, the hot rolled steel sheet is cold rolled one time or more with process annealing performed interposed so as to obtain cold rolled steel sheet, followed by a process of rapidly heating then decarburization annealing the steel sheet, a process of coating the surface of the cold rolled steel sheet after decarburization annealing with an annealing separator comprising sulfates or sulfides and having MgO as its main constituent, then performing finish annealing, a process of performing strictly controlled finish annealing, and a process (Continued)

of coating an insulating coating, then performing flattening annealing.

3 Claims, 1 Drawing Sheet

(51) Int. Cl.
| | |
|---|---|
| *C21D 8/00* | (2006.01) |
| *C21D 8/12* | (2006.01) |
| *C21D 9/46* | (2006.01) |
| *C22C 38/02* | (2006.01) |
| *C22C 38/04* | (2006.01) |
| *C22C 38/06* | (2006.01) |
| *C22C 38/60* | (2006.01) |
| *H01F 1/147* | (2006.01) |
| *H01F 1/18* | (2006.01) |

(52) U.S. Cl.
CPC ......... *C21D 8/1222* (2013.01); *C21D 8/1233* (2013.01); *C21D 8/1261* (2013.01); *C21D 8/1272* (2013.01); *C21D 8/1283* (2013.01); *C22C 38/001* (2013.01); *C22C 38/002* (2013.01); *C22C 38/02* (2013.01); *C22C 38/04* (2013.01); *C22C 38/06* (2013.01); *C22C 38/60* (2013.01); *H01F 1/147* (2013.01); *H01F 1/18* (2013.01); *C22C 2202/02* (2013.01)

(58) Field of Classification Search
USPC .......................................................... 428/469
See application file for complete search history.

(56) References Cited

U.S. PATENT DOCUMENTS

| | | |
|---|---|---|
| 2010/0055481 A1 | 3/2010 | Kubo et al. |
| 2015/0243419 A1 | 8/2015 | Senda et al. |
| 2019/0055619 A1 | 2/2019 | Imamura et al. |

FOREIGN PATENT DOCUMENTS

| | | |
|---|---|---|
| JP | 40-15644 B | 7/1965 |
| JP | 51-13469 B | 4/1976 |
| JP | 6-88171 A | 3/1994 |
| JP | 7-268567 A | 10/1995 |
| JP | 2009-235574 A | 10/2009 |
| JP | 2010-280970 A | 12/2010 |
| JP | 2012-214902 A | 11/2012 |
| JP | 5230194 B2 | 7/2013 |
| JP | 5419459 B2 | 2/2014 |
| WO | WO2014/049770 A1 | 4/2014 |

* cited by examiner

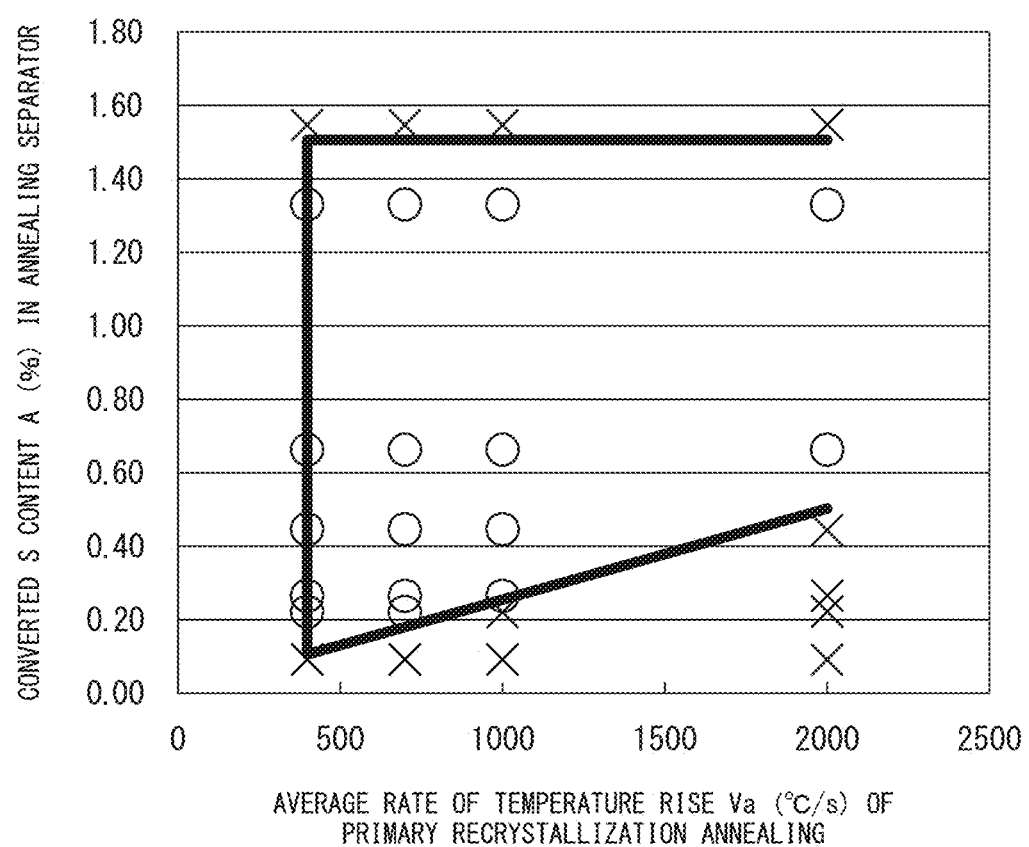

METHOD FOR MANUFACTURING GRAIN-ORIENTED ELECTRICAL STEEL SHEET AND GRAIN-ORIENTED ELECTRICAL STEEL SHEET

FIELD

The present invention relates to grain-oriented electrical steel sheet and a method for manufacturing grain-oriented electrical steel sheet.

BACKGROUND

Grain-oriented electrical steel sheet is steel sheet containing, by mass %, Si in 2 mass % to 5 mass % or so and having orientations of the crystal grains of the steel sheet controlled to the {110}<001> orientation called the Goss orientation. Grain-oriented electrical steel sheet is excellent in magnetic properties and, for example, is utilized as the iron core material of transformers and other static inducers.

In such grain-oriented electrical steel sheet, various development efforts are underway to improve the magnetic properties. In particular, along with the demand for energy conservation in recent years, further reduction of the iron loss is being sought in grain-oriented electrical steel sheet. To lower the iron loss of grain-oriented electrical steel sheet, it is effective to raise the degree of integration of the orientations of crystal grains of the steel sheet to the Goss orientation so as to improve the magnetic flux density and lower the hysteresis loss.

Here, in the manufacture of grain-oriented electrical steel sheet, crystal orientations are being controlled by utilizing the phenomenon of catastrophic grain growth called "secondary recrystallization". However, to suitably control the crystal orientations by secondary recrystallization, it is important to improve the heat resistance of the fine precipitates in the steel called "inhibitors".

For example, the method may be mentioned of making inhibitors completely dissolve at the time of heating a steel slab before hot rolling then making them finely precipitate in the hot rolling and later annealing process. Specifically, the method such as illustrated in the following PTL 1 of using MnS and AlN as inhibitors and rolling by a rolling reduction of over 80% in the final cold rolling process and the method such as illustrated in the following PTL 2 of using MnS and MnSe as inhibitors and performing a cold rolling process two times may be mentioned.

As art for further improving the flux density, for example, the following PTL 3 discloses the art of adding 100 to 5000 g/T of Bi to molten steel. Art is disclosed for raising the magnetic flux density in the final product sheet if adding Bi to molten steel. However, there is the problem that the adhesion of a primary coating having $Mg_2SiO_4$ (forsterite) as a main constituent and the steel sheet deteriorates and the coating peels off when bending the final product sheet. The following PTLs 4 to 6 disclose the art of composite addition of a compound of a rare earth metal and a compound of an alkali earth metal to an annealing separator to improve the adhesion between the primary coating and steel sheet.

Further, the following PTL 7 discloses the art of manufacturing grain-oriented electrical steel sheet reduced in iron loss over the entire coil length by controlling the heat pattern in the process of temperature rise of primary recrystallization annealing. Furthermore the following PTL 8 discloses the art of reducing the value of iron loss of grain-oriented electrical steel sheet by carefully controlling the average particle size and angle of deviation from the ideal orientation of the crystal grains after secondary recrystallization.

CITATIONS LIST

Patent Literature

[PTL 1] Japanese Examined Patent Publication No. 40-15644
[PTL 2] Japanese Examined Patent Publication No. 51-13469
[PTL 3] Japanese Unexamined Patent Publication No. 6-88171
[PTL 4] Japanese Patent No. 5419459
[PTL 5] Japanese Patent No. 5230194
[PTL 6] Japanese Unexamined Patent Publication No. 2012-214902
[PTL 7] WO2014/049770
[PTL 8] Japanese Unexamined Patent Publication No. 7-268567

SUMMARY

Technical Problem

In recent years, due to increasing regulations on efficiency of transformers in the world, demand for reducing the iron loss of grain-oriented electrical steel sheet has increased. The more the amount of addition of Bi to molten steel increases, the more the magnetic flux density is improved and the lower the iron loss than can be expected, but there is the problem that the adhesion of the primary coating and steel sheet deteriorates. Further, from the need for saving space in substation equipment, transformer cores are being made increasingly smaller, so the degree of bending of the final product sheets becomes greater and the adhesion of the primary coating and steel sheet has to be improved.

However, with just the arts disclosed in the above PTLs 4 to 6, when increasing the amount of addition of Bi or when the degree of bending of the final product sheets becomes greater, there was the problem of the primary coating ending up peeling off from the steel sheet. Art for improving the adhesion of a primary coating and steel sheet has become necessary.

Further, as disclosed in the above PTL 7, it is confirmed that in the process of temperature rise in primary recrystallization annealing, rapidly raising the temperature by 100° C./s or more between 500° C. to 600° C. has a great effect on the magnetic properties of grain-oriented electrical steel sheet. PTL 8 discloses to set the temperature of the temperature rise up to 850° C. in the process of temperature rise of the primary recrystallization annealing to 300° C./s.

However, in the above PTLs 7 and 8, what kind of effect there is on the magnetic properties of grain-oriented electrical steel sheet if making the rate of temperature rise in the primary recrystallization annealing further rise has not been studied in detail.

Further, the rapid rise in temperature in primary recrystallization annealing ends up increasing the fluctuation in the magnetic flux density B8 of the grain-oriented electrical steel sheet for each coil. Therefore, even if rapidly raising the temperature, depending on the conditions of the contents of the annealing separator, low iron loss grain-oriented electrical steel sheet sometimes is not obtained.

Therefore, the present invention was made in consideration of the above problem. The object of the present invention is to provide a novel and improved method for manufacturing grain-oriented electrical steel sheet enabling the manufacture of grain-oriented electrical steel sheet with a higher magnetic flux density and excellent in adhesion of the primary coating and steel sheet when adding Bi to molten steel to strengthen the heat resistance of the inhibitor and simultaneously rapidly raising the temperature by primary recrystallization annealing and to provide grain-oriented electrical steel sheet manufactured by this method of manufacture.

Solution to Problem

To solve this problem, according to one aspect of the present invention, there is provided a method for manufacturing grain-oriented electrical steel sheet comprising a process of heating to 1280° C. or more and hot rolling a slab containing, by mass %, C: 0.02% or more and 0.10% or less, Si: 2.5% or more and 4.5% or less, Mn: 0.01% or more and 0.15% or less, a total of one or both of S and Se: 0.001% or more and 0.050% or less, acid soluble Al: 0.01% or more and 0.05% or less, N: 0.002% or more and 0.015% or less, and Bi: 0.0005% or more and 0.05% or less and having a balance of Fe and impurities so as to obtain hot rolled steel sheet, a process, after hot rolling annealing the hot rolled steel sheet, of cold rolling it one time or cold rolling it two times or more with process annealing performed interposed so as to obtain cold rolled steel sheet, a process of primary recrystallization annealing the cold rolled steel sheet, a process of coating the surface of the cold rolled steel sheet after primary recrystallization annealing with an annealing separator containing MgO, then performing finish annealing, and a process of coating the steel sheet after the finish annealing with an insulating coating then performing flattening annealing, where in the process of temperature rise of the primary recrystallization annealing, an average rate of temperature rise Va1 (° C./s) between the start of temperature rise and 550° C., an average rate of temperature rise Va2 (° C./s) between 550° C. and 700° C., and an average rate of temperature rise Va3 (° C./s) between 700° C. and the end of temperature rise satisfy $$Va1 \le Va2, 400 \le Va2, Va3 \le Va2,$$

in the annealing separator, when the content of MgO in the annealing separator is, by mass %, 100%, $TiO_2$ is contained in 0.5% or more 10% or less, one or more compounds among oxides, sulfides, sulfates, silicides, phosphates, hydroxides, carbonates, borides, chlorides, and fluorides of rare earth metals are contained, converted to rare earth metals, in 0.1% or more and 10% or less, one or more compounds among sulfates, carbonates, hydroxides, chlorides, and oxides of alkali earth metals selected from a group comprised of Ca, Sr, and Ba are contained, converted to alkali earth metals, in 0.1% or more and 10% or less, and sulfates or sulfides are contained, converted to sulfur element, in A %, where A satisfies the following formula:

$$(0.00025 \times Va2) \le A \le 1.5$$

and in the process of temperature rise of the finish annealing, a rate of release of moisture from the annealing separator from room temperature to 700° C. is 0.5% or more and 6.0% or less and an average rate of temperature rise Vf (° C./h) from 900° C. to 1100° C. satisfies the following formula:

$$5 \le Vf \le (21 - 4 \times A).$$

Further, to solve the problem, according to another aspect of the present invention, there is provided grain-oriented electrical steel sheet comprising a base metal steel sheet containing, by mass %, C: 0.005% or less, Si: 2.5 to 4.5%, and Mn: 0.01 to 0.15% and having a balance of Fe and impurities and a primary coating formed on a surface of the base metal steel sheet and containing $Mg_2SiO_4$ as its main constituent, in which grain-oriented electrical steel sheet, a peak position $D_{Al}$ of Al emission intensity obtained when analyzing the elements by glow discharge optical emission spectrometry from a surface of the primary coating in a thickness direction of the grain-oriented electrical steel sheet is present in a range from the surface of the primary coating to 2.0 to 12.0 μm in the thickness direction, a number density ND of the Al oxides is 0.02 to 0.20/μm$^2$, a peak position $D_S$ of S emission intensity obtained when analyzing the elements by glow discharge optical emission spectrometry from a surface of the primary coating in a thickness direction of the grain-oriented electrical steel sheet is present in a range from the surface of the primary coating to 1.0 to 10.0 μm in the thickness direction, $D_S < D_{Al}$, and a value of the magnetic flux density B8 is 1.92 T or more.

In the grain-oriented electrical steel sheet, the base metal steel sheet may further contain, by mass %, one or more of Cu: 0.01% or more and 0.30% or less, Sn: 0.01% or more and 0.30% or less, Ni: 0.01% or more and 0.30% or less, Cr: 0.01% or more and 0.30% or less, or Sb: 0.01% or more and 0.30% or less.

Advantageous Effects of Invention

According to the present invention, it is possible to provide a method for manufacturing grain-oriented electrical steel sheet adding Bi to molten steel to strengthen the heat resistance of the inhibitor and simultaneously suitably adding rare earth metal compounds and alkali earth metal compounds to an annealing separator to improve the adhesion of the primary coating and steel sheet, making the rate of temperature rise of the primary recrystallization annealing a fast rate to thereby increase the Goss oriented grains near the surface layer, and suitably controlling the content of the sulfur element in the annealing separator and the rate of temperature rise and amount of release of moisture from the annealing separator in the finish annealing so as to make disappearance of the Goss oriented grains difficult in the secondary recrystallization process to improve the magnetic flux density.

Further, according to the present invention, it is possible to provide grain-oriented electrical steel sheet high in magnetic flux density and excellent in adhesion of the primary coating and steel sheet.

BRIEF DESCRIPTION OF THE DRAWINGS

The Figure is a graph plotting the results shown in Table 1 taking the average rate of temperature rise Va2 (° C./s) between 550° C. and 700° C. in the process of temperature rise of the primary recrystallization annealing along the abscissa and the content A (%) converted to the sulfur element as the content of sulfates or sulfides in the annealing separator along the ordinate.

DESCRIPTION OF EMBODIMENTS

Below preferred embodiments of the present invention will be explained in detail. Note that so long as not indicated otherwise, for the values A and B the expression "A to B" will mean "A or more and B or less". In such an expression, if indicating the units only for the value B, the units will also be deemed to apply to the value A.

Method for Manufacturing Grain-Oriented Electrical Steel Sheet

The inventors intensively studied a method for manufacturing grain-oriented electrical steel sheet for improving the adhesion of the primary coating and steel sheet of the grain-oriented electrical steel sheet while improving the magnetic properties and as a result discovered the following:

Specifically the inventors discovered that in grain-oriented electrical steel sheet, by adding Bi to the molten steel, the heat resistance of the inhibitor is strengthened and improvement of the magnetic flux density is expected, but adhesion of the primary coating and steel sheet deteriorates and that, to deal with this problem, the adhesion of the primary coating and steel sheet can be improved by adding rare earth metal compounds and alkali earth metal compounds to the annealing separator.

On the other hand, if sulfates or sulfides are contained in the annealing separator, there was the problem that depending on the conditions of the rate of temperature rise of the primary recrystallization annealing, rate of temperature rise of the finish annealing, and release of moisture from the annealing separator, a high magnetic flux density could not be obtained in the grain-oriented electrical steel sheet. Therefore, the inventors engaged in intensive research from the viewpoint of making it difficult for the Goss oriented grains near the surface layer, which were increased by increasing the speed of the rate of temperature rise of the primary recrystallization annealing, to be eliminated in the secondary recrystallization process and discovered that by suitably controlling the content of the sulfur element in the annealing separator, the rate of temperature rise in the finish annealing, and the amount of release of moisture from the annealing separator, it is possible to improve the magnetic flux density.

The inventors considered the above findings and arrived at the present invention. One embodiment of the present invention is a method for manufacturing grain-oriented electrical steel sheet provided with the following constitution.

The method comprises a process of heating to 1280° C. or more and hot rolling a slab containing, by mass %, C: 0.02% or more and 0.10% or less, Si: 2.5% or more and 4.5% or less, Mn: 0.01% or more and 0.15% or less, a total of one or both of S and Se: 0.001% or more and 0.050% or less, acid soluble Al: 0.01% or more and 0.05% or less, N: 0.002% or more and 0.015% or less, and Bi: 0.0005% or more and 0.05% or less and having a balance of Fe and impurities so as to obtain hot rolled steel sheet, a process, after hot rolling annealing the hot rolled steel sheet, of cold rolling it one time or cold rolling it two times or more with process annealing performed interposed so as to obtain cold rolled steel sheet, a process of primary recrystallization annealing the cold rolled steel sheet, a process of coating the surface of the cold rolled steel sheet after primary recrystallization annealing with an annealing separator containing MgO, then performing finish annealing, and a process of coating the steel sheet after the finish annealing with an insulating coating then performing flattening annealing, where in the process of temperature rise of the primary recrystallization annealing, an average rate of temperature rise Va1 (° C./s) between the start of temperature rise and 550° C., an average rate of temperature rise Va2 (° C./s) between 550° C. and 700° C., and an average rate of temperature rise Va3 (° C./s) between 700° C. and the end of temperature rise satisfy $$Va1 \leq Va2, 400 \leq Va2, Va3 \leq Va2,$$

in the annealing separator, when the content of MgO in the annealing separator is, by mass %, 100%, $TiO_2$ is contained in 0.5% or more 10% or less, one or more compounds among oxides, sulfides, sulfates, silicides, phosphates, hydroxides, carbonates, borides, chlorides, and fluorides of rare earth metals are contained, converted to rare earth metals, in 0.1% or more and 10% or less, one or more compounds among sulfates, carbonates, hydroxides, chlorides, and oxides of alkali earth metals selected from a group comprised of Ca, Sr, and Ba are contained, converted to alkali earth metals, in 0.1% or more and 10% or less, and sulfates or sulfides are contained, converted to sulfur element, in A %, where A satisfies the following formula:

$$(0.00025 \times Va2) \leq A \leq 1.5$$

and in the process of temperature rise of the finish annealing, a rate of release of moisture from the annealing separator from room temperature to 700° C. is 0.5% or more and 6.0% or less and an average rate of temperature rise Vf (° C./h) from 900° C. to 1100° C. satisfies the following formula:

$$5 \leq Vf(21-4 \times A).$$

Below, the method for manufacturing grain-oriented electrical steel sheet according to the present embodiment will be specifically explained.

Composition of Constituents of Slab

First, the composition of constituents of the slab used for the grain-oriented electrical steel sheet according to the present embodiment will be explained. Note that, below, unless otherwise indicated, the expression "%" will be deemed to indicate "mass %". Further, the balance of the slab aside from the elements described below is comprised of Fe and impurities.

The content of C (carbon) is 0.02% or more and 0.10% or less. C has various roles, but if the content of C is less than 0.02%, the crystal grain size becomes excessively large at the time of heating the slab which makes the value of the iron loss of the final grain-oriented electrical steel sheet increase, so this is not preferable. If the content of C is over 0.10%, at the time of decarburization after cold rolling, the decarburization time becomes long and the manufacturing costs increase, so this is not preferable. Further, if the content of C is over 0.10%, decarburization easily becomes incomplete and there is a possibility of magnetic aging being caused in the final grain-oriented electrical steel sheet, so this is not preferable. Therefore, the content of C is 0.02% or more and 0.10% or less, preferably 0.05% or more and 0.09% or less.

The content of Si (silicon) is 2.5% or more and 4.5% or less. Si raises the electrical resistance of steel sheet to thereby reduce the eddy current loss, one factor of iron loss. If the content of Si is less than 2.5%, it becomes difficult to sufficiently suppress the eddy current loss of the final grain-oriented electrical steel sheet, so this is not preferable. If the content of Si is over 4.5%, the workability of the grain-oriented electrical steel sheet falls, so this is not preferable. Therefore, the content of Si is 2.5% or more and 4.5% or less, preferably 2.7% or more and 4.0% or less.

The content of Mn (manganese) is 0.01% or more and 0.15% or less. Mn forms MnS and MnSe etc. which are inhibitors governing secondary recrystallization. If the content of Mn is less than 0.01%, the absolute amount of MnS and MnSe causing secondary recrystallization becomes insufficient, so this is not preferable. If the content of Mn is over 0.15%, at the time of slab heating, it becomes difficult for Mn to dissolve, so this is not preferable. Further, if the content of Mn is over 0.15%, the precipitated size of the inhibitors MnS and MnSe easily becomes coarser and the optimal size distribution as inhibitors is lost, so this is not preferable. Therefore, the content of Mn is 0.01% or more and 0.15% or less, preferably 0.03% or more and 0.13% or less.

The contents of S (sulfur) and Se (selenium) are in total 0.001% or more and 0.050% or less. S and Se form inhibitors together with the above-mentioned Mn. S and Se may both be contained in the slab, but it is sufficient that at least one of them be contained in the slab. If the total of the contents of S and Se is outside of the above range, a sufficient inhibitor effect is not obtained, so this is not preferable. Therefore, the contents of S and Se are in total 0.001% or more and 0.050% or less, preferably 0.001% or more and 0.040% or less.

The content of the acid soluble Al (acid soluble aluminum) is 0.01% or more and 0.05% or less. Acid soluble Al forms an inhibitor required for manufacture of high magnetic flux density grain-oriented electrical steel sheet. If the content of the acid soluble Al is less than 0.01%, the acid soluble Al becomes insufficient in amount and the strength of the inhibitor becomes insufficient, so this is not preferable. If the content of the acid soluble Al is over 0.05%, the AlN precipitating as an inhibitor coarsens and causes a drop in the inhibitor strength, so this is not preferable. Therefore, the content of the acid soluble Al is 0.01% or more and 0.05% or less, preferably 0.01% or more and 0.04% or less.

The content of N (nitrogen) is 0.002% or more and 0.015% or less. N forms the inhibitor AlN with the above-mentioned acid soluble Al. If the content of N is outside of the above range, a sufficient inhibitor effect is not obtained, so this is not preferable. Therefore, the content of N is 0.002% or more and 0.015% or less, preferably 0.002% or more and 0.012% or less.

The content of Bi (bismuth) is 0.0005% or more and 0.05% or less. Bi is believed to have the effect of strengthening the heat resistance of the inhibitors MnS and AlN to raise the secondary recrystallization temperature and improve the magnetic flux density. If the content of Bi is less than 0.0005%, a sufficient effect of strengthening the inhibitor heat resistance is not obtained, so this is not preferable. If the content of Bi is over 0.05%, the steel sheet becomes brittle in the hot rolling and becomes difficult to run causing a drop in productivity, so this is not preferable. Therefore, the content of Bi is 0.0005% or more and 0.05% or less, preferably 0.0010% or more and 0.02% or less.

Further, the slab used for manufacture of the grain-oriented electrical steel sheet according to the present embodiment may further contain, in addition to the above-mentioned elements, one or more of Cu, Sn, Ni, Cr, and Sb as elements for stabilizing the secondary recrystallization. If the slab contains the above elements, the magnetic flux density of the grain-oriented electrical steel sheet manufactured can be further improved.

Note that, the contents of these elements may also be 0.01% or more and 0.3% or less. If the contents of these elements are less than 0.01%, the effect of stabilizing the secondary recrystallization becomes harder to sufficiently obtain, so this is not preferable. If the contents of these elements are over 0.3%, the effect of stabilizing the secondary recrystallization becomes saturated, so this is not preferable from the viewpoint of suppressing increase of the manufacturing costs.

A slab is formed by casting the molten metal adjusted to the composition of constituents explained above. Note that the method of casting the slab is not particularly limited. Further, even if a steel ingot is formed by a vacuum melting furnace etc. in R&D, a similar effect as the case where that slab was formed by the same constituents can be obtained.

Process for Forming Hot Rolled Steel Sheet Next, the slab is heated and hot rolled to be worked to a hot rolled steel sheet. By the slab being heated to 1280° C. or more, the inhibitor constituents in the slab completely dissolve. If the heating temperature of the slab is less than 1280° C., it becomes difficult for the MnS, MnSe, AlN, and other inhibitor constituents to be sufficiently solubilized, so this is not preferable. Note that, the upper limit value of the heating temperature of the slab at this time is not particularly set, but from the viewpoint of protection of the equipment, 1450° C. is preferable. For example, the heating temperature of the slab may be 1300° C. or more and 1450° C. or less.

Next, the heated slab is hot rolled to work it into a hot rolled steel sheet. The thickness of the hot rolled steel sheet after being worked is, for example, 1.8 mm or more and 3.5 mm or less. If the thickness of the hot rolled steel sheet is less than 1.8 mm, the temperature of the steel sheet after the hot rolling becomes lower and the amount of AlN precipitating in the steel sheet increases, whereby the secondary recrystallization becomes unstable and, in grain-oriented electrical steel sheet with a final thickness of 0.23 mm or less, the magnetic properties fall, so this is not preferable. If the thickness of the hot rolled steel sheet is over 3.5 mm, the rolling load in the process of cold rolling becomes greater, so this is not preferable.

Process for Forming Cold Rolled Steel Sheet Next, the worked hot rolled steel sheet is hot rolling annealed, then is rolled by a single cold rolling operation or by multiple cold rolling operations with process annealing interposed to work it into a cold rolled steel sheet. Note that, if rolling by multiple cold rolling operations with process annealing interposed, the prior stage hot rolling annealing can also be omitted. However, if performing hot rolling annealing, the shape of the steel sheet becomes better, so the possibility of the steel sheet breaking during cold rolling can be reduced.

Further, between passes of cold rolling, between roll stands, or during rolling, the steel sheet may be heat treated at 300° C. or so or less. In such a case, it is possible to improve the magnetic properties of the final grain-oriented electrical steel sheet. Note that, the hot rolled steel sheet may be rolled by three or more cold rolling operations, but multiple cold rolling operations increase the manufacturing costs, so the hot rolled steel sheet is preferably rolled by one or two cold rolling operations. If performing the cold rolling by reverse rolling such as a Sendzimir mill, the number of passes in the respective cold rolling operations is not particularly limited, but from the viewpoint of the manufacturing costs, it is preferably nine or less.

Process for Primary Recrystallization Annealing

Next, the cold rolled steel sheet is rapidly raised in temperature, then decarburization annealed. These processes are called "primary recrystallization annealing" and are preferably performed consecutively. Due to the primary recrystallization annealing, in the cold rolled steel sheet, the Goss oriented grains are made to increase before the secondary recrystallization whereby, in the secondary recrystallization process, grain-oriented grains closer to the ideal Goss orientations can be expected to be secondarily recrystallized, so it is possible to improve the magnetic flux density of the final grain-oriented electrical steel sheet.

Primary recrystallization annealing is generally performed by starting to raise the temperature from near room temperature and raising the temperature to the decarburization annealing temperature. The rate of temperature rise during that time varies. On the other hand, in the present invention, as explained below, the average rate of temperature rise Va1 (° C./s) between the start of temperature rise and 550° C., the average rate of temperature rise Va2 (° C./s) between 550° C. and 700° C., and average rate of temperature rise Va3 (° C./s) between 700° C. and the end of the temperature rise are made Va1≤Va2, 400≤Va2, Va3≤Va2. The temperature of start of temperature rise and peak temperature of the primary recrystallization annealing are not particularly limited.

In the method for manufacturing grain-oriented electrical steel sheet according to the present embodiment, the rapid rise in temperature of the cold rolled steel sheet in the primary recrystallization annealing is made an average rate of temperature rise Va2 between 550° C. and 700° C. of 400° C./s or more. Due to this, in the present embodiment, it is possible to further make the Goss oriented grains increase before secondary recrystallization of the cold rolled steel sheet and possible to improve the magnetic flux density of the final grain-oriented electrical steel sheet. The temperature range of the rapid temperature rise is 550° C. to 700° C. If the start temperature of the rapid temperature is over 550° C., the restoration of dislocations in the steel sheet greatly proceeds and primary recrystallization of the oriented grains other than the Goss oriented grains ends up starting, so the effect of increasing the Goss oriented grains is decreased, so this is not preferable. If the end temperature of the rapid temperature rise is less than 700° C., the primary recrystallization of the other oriented grains ends up finishing before the primary recrystallization of the Goss oriented grains finishes, so the effect of increasing the Goss oriented grains is decreased, so this is not preferable.

Further, if making the average rate of temperature rise Va2 between 550° C. and 700° C. a rate of 700° C./s or more, it is possible to make the Goss oriented grains before secondary recrystallization further increase and possible to further improve the magnetic flux density of the final grain-oriented electrical steel sheet, so this is more preferable. On the other hand, if the average rate of temperature rise Va2 is less than 400° C./s, the Goss oriented grains become insufficient, so in the secondary recrystallization process, oriented grains other than oriented grains close to the ideal Goss orientations, for example, swinging Goss oriented grains etc., end up abnormally growing in size, so the magnetic flux density of the final grain-oriented electrical steel sheet ends up deteriorating, so this is not preferable.

Furthermore, it became clear that if the average rate of temperature rise Va2 between 550° C. and 700° C. is 400° C./s or more, the penetration of sulfur contained in the annealing separator into the steel sheet is promoted in the process of temperature rise of the finish annealing, MnS is formed and abnormal grain growth other than of the Goss oriented grains is suppressed, and as a result abnormal grain growth of the Goss oriented grains is promoted.

The mechanism due to which if the average rate of temperature rise Va2 between 550° C. and 700° C. is 400° C./s or more in the process of temperature rise of the primary recrystallization annealing, the penetration of sulfur contained in the annealing separator into the steel sheet is promoted in the process of temperature rise of the finish annealing is not necessarily clear, but is believed to be as follows: First, if the average rate of temperature rise between 550° C. and 700° C. is 400° C./s or more in the process of temperature rise of the primary recrystallization annealing, the dwell time at 550° C. to 700° C. is short, so formation of an oxide layer, in particular formation of an external oxide film, is suppressed. Next, in the succeeding decarburization annealing, the amount of formation of the external oxide film is made to decrease, so formation of an internal oxide layer is promoted. Finally, it is guessed that the interface of the internal oxide layer and the base iron forms a path for sulfur diffusion and penetration of sulfur from the annealing separator is promoted in the process of temperature rise of the finish annealing.

Note that, the average rate of temperature rise Va2 between 550° C. and 700° C. is the average rate of temperature rise when the temperature of the steel sheet rises to 550° C. to 700° C.

Such a rapid rise in temperature, for example, can be performed by using ohmic heating or induction heating.

The average rate of temperature rise Va1 (° C./s) between the start of temperature rise and 550° C. is made Va1≤Va2. If Va1>Va2, the temperature of the steel sheet becomes uneven before the rapid temperature rise between 550° C. and 700° C., the effect of rapid heating becomes varied, and sometimes the magnetic properties of the finally obtained grain-oriented electrical steel sheet are not improved, so this is not preferable.

The average rate of temperature rise Va3 (° C./s) between 700° C. and the end of the temperature rise is made Va3≤Va2. If Va3>Va2, sometimes the oxide film after the decarburization annealing changes, the expected effect of penetration of sulfur from the annealing separator in the process of temperature rise in the finish annealing is not obtained, and the magnetic properties of the finally obtained grain-oriented electrical steel sheet are not improved. While this mechanism is not necessarily clear, it is surmised that if Va3>Va2, the oxide film after the decarburization annealing becomes too thick, the amount of penetration of sulfur from the annealing separator in the process of temperature rise of the finish annealing decreases, and the effect of increase of Goss oriented grains due to the process of temperature rise of the primary recrystallization cannot be sufficiently utilized.

Here, the process of temperature rise may be performed by multiple equipment. For example, restoration of the steel sheet, that is, holding it or gradually cooling it at a temperature lower than 550° C. at which a reduction in the dislocation density in the steel occurs, can also improve the temperature uniformity of the steel sheet before a temperature rise, so may also be performed. Furthermore, the process of temperature rise including a temperature rise from 550° C. to 700° C. may be performed by one or more apparatuses.

The point at which the temperature rise is started is the point at the low temperature side of 550° C. or less where there is a shift from a state where the temperature of the steel sheet falls to a state where the temperature of the steel sheet rises (that is, the point where the change in temperature becomes minimal). Further, the point where the temperature rise ends is the point at the high temperature side of 700° C. or more where there is a shift from a state where the temperature of the steel sheet rises to a state where the temperature of the steel sheet falls (that is, the point where the change in temperature becomes maximal).

Here, the method of judging the start point of temperature rise and the end point of rapid temperature rise is not particularly limited, but for example it can be judged by using a radiant thermometer etc. to measure the temperature of the steel sheet. Note that, the method of measuring the steel sheet temperature is not particularly limited. Further, whether the end temperature of temperature rise of the primary recrystallization is lower than or higher than the succeeding decarburization annealing temperature, the effect of the present invention is not impaired. If the end temperature of the temperature rise of the primary recrystallization is lower than the decarburization annealing temperature, the steel sheet may be heated in the decarburization annealing process. If the end temperature of temperature rise of the primary recrystallization is higher than the decarburization annealing temperature, heat discharge treatment, gas cooling treatment, etc. may be performed to cool the steel sheet temperature. Furthermore, the steel sheet may be cooled to a temperature lower than the decarburization annealing temperature, then reheated in the decarburization annealing process.

However, it is difficult to measure the steel sheet temperature. If it is difficult to estimate the accurate locations of the start point of temperature rise and the end point of rapid temperature rise, it is possible to compare the heat patterns of the process of temperature rise and the process of cooling so as to estimate these locations. Further, it is possible to make the inlet side temperature of the steel sheet to the temperature raising apparatus in the process of temperature rise and the exit side temperature the start point of temperature rise and the end point of rapid temperature rise.

Here, the atmosphere in the process of temperature rise of the primary recrystallization annealing may be made one with an oxygen partial pressure, that is, a ratio $P_{H2O}/P_{H2}$ of the water vapor partial pressure $P_{H2O}$ and the hydrogen partial pressure $P_{H2}$ in the atmosphere, for example 0.1 or less, so as not to obstruct the decarburization in the succeeding decarburization annealing.

Next, the cold rolled steel sheet is decarburization annealed. The decarburization annealing is performed at a temperature of 900° C. or less in a hydrogen- and nitrogen-containing wet atmosphere. Note that, in the process of the primary recrystallization annealing, reducing annealing may be performed on the cold rolled steel sheet following the decarburization annealing for the purpose of improving the magnetic properties and coating properties.

Process for Finish Annealing After that, the cold rolled steel sheet after the primary recrystallization annealing is finish annealed. At this time, to prevent sticking between the steel sheets, form the primary coating, control the secondary recrystallization behavior, etc., an annealing separator having MgO as its main constituent is coated before the finish annealing. The annealing separator is generally coated and dried on the surface of the steel sheet in the state of an aqueous slurry, but electrostatic coating etc. may also be used. Here, the additives in the annealing separator have a major effect in particular on the adhesion of the primary coating and steel sheet and the secondary recrystallization behavior. Below, the contents of the additives in the annealing separator and the effects will be described. Here, the contents are the contents (mass %) of the additives when defining the content of MgO of the main constituent of the annealing separator as 100%. The "main constituent" means a constituent contained in 50 mass % or more in a certain substance, preferably 70 mass % or more, more preferably 90 mass % or more.

The amount of deposition of the annealing separator on the steel sheet is, per side, preferably for example 2 g/m² or more and 10 g/m² or less. If the amount of deposition of the annealing separator on the steel sheet is less than 2 g/m², in the finish annealing, the steel sheets will end up sticking to each other, so this is not preferable. If the amount of deposition of the annealing separator on the steel sheet is over 10 g/m², the manufacturing costs increase, so this is not preferable.

In the annealing separator, the content of $TiO_2$ is 0.5% or more and 10% or less. $TiO_2$ has a major effect on the adhesion of the primary coating and steel sheet. If less than 0.5%, the effect of improvement of adhesion is not sufficient. Further, if over 10%, in the process of finish annealing, the Ti dissolves in the steel sheet, then forms TiC and other fine precipitates to cause the magnetic properties to deteriorate (magnetic aging), so this is not preferable. Therefore, the content of $TiO_2$ is 0.5% or more and 10% or less, more preferably 1.0% or more and 8% or less.

In the annealing separator, the content of the rare earth metal compounds is, converted to rare earth metals, 0.1% or more and 10% or less. If less than 0.1%, the effect of improvement of the adhesion is not sufficient, while if over 10%, the manufacturing costs increase, so this is not preferable. Therefore, the content of rare earth metal compounds is, converted to rare earth metals, 0.1% or more and 10% or less, more preferably 0.2% or more and 8% or less. The rare earth metal compounds are not particularly limited. One or more of oxides, sulfides, sulfates, silicides, phosphates, hydroxides, carbonates, borides, chlorides, and fluorides may be mixed. As the rare earth metal compounds, compounds of La, Ce, and Y are more preferably used from the viewpoint of ease of acquisition and costs. That is, in the present invention, the rare earth metals are more preferably selected from the group comprised of La, Ce, and Y.

In the annealing separator, the content of the alkali earth metal compounds is, converted to alkali earth metals, 0.1% or more and 10% or less. If less than 0.1%, the effect of improvement of the adhesion is not sufficient, while if over 10%, the coatability of the annealing separator slurry deteriorates, so this is not preferable. Therefore, the content of the alkali earth metal compounds is, converted to alkali earth metals, 0.1% or more and 10% or less, more preferably 0.2% or more and 8% or less. Note that, the compounds of alkali earth metals are not particularly limited, but are preferably sulfates, carbonates, hydroxides, chlorides, and oxides of alkali earth metals selected from the group comprised of Ca, Sr, and Ba. Further, one or more of these compounds may be mixed.

In the annealing separator, the content of sulfates or sulfides, converted to sulfur element, satisfies the condition of $(0.00025 \times Va2) \leq A \leq 1.5$ as A %. If $A < (0.00025 \times Va2)$, it is not possible to utilize the effect of raising the rate of temperature rise of the primary recrystallization annealing to make the Goss oriented grains increase and the effect of improvement of the magnetic flux density becomes smaller, so this is not preferable. If $1.5 < A$, the secondary recrystallization becomes insufficient, so this is not preferable. Therefore, the content of sulfates or sulfides, converted to sulfur element, satisfies the condition of $(0.00025 \times Va2) \leq A \leq 1.5$ as A %.

The detailed reason why such a phenomenon occurs is not clear, but it is guessed that this is because the sulfates or sulfides contained in the annealing separator have an effect on the behavior of inhibitor strength in the process of secondary recrystallization. That is, by making the rate of temperature rise of the primary recrystallization annealing 400° C./s or more, Goss oriented grains mainly increase near the surface layer. On the other hand, if the annealing separator contains sulfur compounds, in the process of secondary recrystallization, the sulfur penetrates into (sulfurizes) the steel sheet to form MnS in the steel whereby the strength of the inhibitors near the surface layer is improved. Here, the behavior in formation of MnS is also strongly affected by the rate of temperature rise of the finish annealing and the rate of release of moisture from the annealing separator. It is guessed that by suitably controlling the content of the sulfur compounds in the annealing separator and the rate of temperature rise of the finish annealing and rate of release of moisture from the annealing separator, a layer suppressing grain growth is formed by MnS near the surface layer, surface layer Goss oriented grains become harder to be replaced by other oriented grains in the process of secondary recrystallization, and the magnetic flux density is improved.

Further, regarding the mechanism due to which adhesion of the primary coating and steel sheet deteriorates if making the slab constituents contain Bi, while details are not clear, it is guessed that the interfacial structure of the primary coating and the steel sheet more easily becomes flatter, the anchor effect is decreased, and the adhesion deteriorates. It is guessed that if rare earth metal compounds and alkali earth metal compounds are suitably contained in the annealing separator, the interfacial structure of the primary coating and the steel sheet becomes complicated and an anchoring effect is exhibited whereby adhesion of the primary coating and steel sheet is improved.

Next, finish annealing is performed for the purpose of formation of the primary coating and secondary recrystallization. The finish annealing, for example, may be performed using a batch type heating furnace etc. to heat treat the steel sheet in a coil shape. Furthermore, to decrease the value of the iron loss of the final grain-oriented electrical steel sheet, the coil shaped steel sheet may be made to rise in temperature to a temperature of 1200° C. or so, then held there as purification treatment.

Finish annealing is generally performed by raising the temperature from room temperature. Further, the rate of temperature rise of the finish annealing varies. On the other hand, the present invention, as explained below, is characterized in that the rate of release of moisture from the annealing separator from room temperature to 700° C. is 0.5% or more and 6.0% or less and the average rate of temperature rise Vf between 900° C. and 1100° C. is made a predetermined range.

The rate of release of moisture from the annealing separator from room temperature to 700° C. in the process of temperature rise of the finish annealing is extremely important for suitably maintaining the state of the internal oxide layer formed by decarburization annealing until sulfur starts to penetrate from the annealing separator to the steel sheet. The rate of release of moisture from the annealing separator from room temperature to 700° C. in the process of temperature rise of the finish annealing is made 0.5% or more and 6.0% or less. If the rate of release of moisture is less than 0.5%, the amount of additional oxidation in the process of temperature rise of the finish annealing becomes insufficient, the internal oxide layer becomes discontinuous in the process of aggregation, and the path of diffusion of sulfur from the surface to the inside layer side disappears, so this is not preferable. On the other hand, if the rate of release of moisture is over 6.0%, the amount of additional oxidation in the process of temperature rise of the finish annealing becomes excessive and decomposition of AlN is promoted too much along with the progress of oxidation of Al in the steel. In particular, sometimes the inhibitor strength at the surface layer falls and swinging Goss oriented grains and other grains grow abnormally, so this is not preferable.

The rate of release of moisture from the annealing separator from room temperature to 700° C. in the process of temperature rise of the finish annealing may, for example, be measured as the rate of decrease of weight between, after coating and drying the annealing separator until the finish annealing is started, when recovering the annealing separator from the surface of the steel sheet and when raising the temperature from room temperature to 700° C. The atmosphere while raising the temperature from room temperature to 700° C. may be nitrogen or may be Ar. The rate of decrease of weight may be calculated by placing the annealing separator in a crucible and measuring the weight before and after the rise in temperature or may be measured by a thermogravimetric analyzer.

The average rate of temperature rise Vf (° C./h) between 900° C. to 1100° C. in the process of temperature rise of the finish annealing is $5 \leq Vf \leq (21-4 \times A)$. If $Vf<5$, the heat treatment time becomes too long and the productivity deteriorates, so this is not preferable. If $(21-4 \times A)<Vf$, the rate of temperature rise is too fast for the sulfates or sulfides in the annealing separator to decompose, so the amount of sulfur penetrating into the steel becomes insufficient, and the layer suppressing grain growth due to MnS near the surface layer is insufficiently formed, so this is not preferable. Therefore, the average rate of temperature rise Vf (° C./h) between 900° C. to 1100° C. in the process of temperature rise of the finish annealing is $5 \leq Vf \leq (21-4 \times A)$. Note that, the average rate of temperature rise Vf is the average rate of temperature rise when the temperature of the steel sheet rises to 900° C. to 1100° C., but if performing the finish annealing by using a batch type heating furnace to heat treat coil-shaped steel sheet, for example, it is also possible to calculate the average rate of temperature rise Vf from the temperature of the heating furnace or the temperature of the coil surface. The temperature range of the average rate of temperature rise Vf is 900° C. to 1100° C. If the starting temperature of the temperature rise of the average rate of temperature rise Vf is over 900° C., it is a temperature region enabling abnormal grain growth of oriented grains other than Goss oriented grains, so the effect of priority growth of Goss oriented grains by the average rate of temperature rise Vf prescribed from the rate of rapid temperature rise in the primary recrystallization annealing and amount of sulfur converted to the element in the annealing separator is decreased, so this is not preferable. If the end temperature of the average rate of temperature rise Vf is less than 1100° C., there is a possibility of secondary recrystallization of the Goss oriented grains not finishing and abnormal grain growth of the other oriented grains occurring, so the effect of priority growth of Goss oriented grains by the average rate of temperature rise Vf is decreased, so this is not preferable.

The heat pattern of the temperature region of 1100° C. or more in the process of temperature rise of the finish annealing is not particularly limited. Conditions of general finish annealing can be used. For example, from the viewpoint of productivity and general limitations on facilities, the pattern may be made 5° C./h to 100° C./h. Further, the annealing may be performed by another known heat pattern as well. In the cooling process as well, the heat pattern is not particularly limited.

The composition of the atmospheric gas in the finish annealing is not particularly limited. In the process of progression of the secondary recrystallization, it may be a mixed gas of nitrogen and hydrogen. It may also be a dry atmosphere or may be a wet atmosphere. The purification annealing may also be performed in dry hydrogen gas.

Process for Flattening Annealing

Next, for the purpose of imparting insulation and tension to the steel sheet after the finish annealing, for example, an insulating coating having aluminum phosphate or colloidal silica etc. as its main constituent is coated on the surface of the steel sheet. After that, for the purpose of baking the insulating coating and flattening the shape of the steel sheet by finish annealing, flattening annealing is performed. Note that, if insulation and tension are imparted to the steel sheet, the constituents of the insulation coating are not particularly limited. Note that, in the present embodiment, depending on the objective at the demand side, the grain-oriented electrical steel sheet may also be treated to control the magnetic domains needless to say.

Due to the above processes, a final grain-oriented electrical steel sheet can be manufactured.

According to the method of manufacture according to the present embodiment, it is possible to manufacture grain-oriented electrical steel sheet excellent in magnetic properties and excellent in adhesion of the primary coating and steel sheet.

The thus obtained grain-oriented electrical steel sheet, when worked into a transformer, for example, a winding iron core transformer, is wound into a predetermined size, then is corrected in shape by a die etc. Here, in particular, at the inside circumference side of the iron core, the steel sheet is worked by an extremely small radius of curvature. To sufficiently prevent peeling of the primary coating and the steel sheet even with such working, it is preferable that the area ratio of peeling of the coating be 10% or less in a 10 mmφ flex adhesion test.

A 10 mmφ flex adhesion test (10 mmφ flex test) means a flex test in which a sample steel sheet is set on the tester using a cylindrical mandrel flex tester. It is performed by observing the surface of the sample steel sheet after the flex test. Further, the area ratio of peeling of the coating means the ratio of the area of the regions from which the primary coating is peeled to the total area of the sample steel sheet.

Grain-Oriented Electrical Steel Sheet

The grain-oriented electrical steel sheet according to the present embodiment is provided with a base metal steel sheet containing predetermined constituents and a primary coating formed on a surface of the base metal steel sheet and containing $Mg_2SiO_4$ as a main constituent.

Composition of Constituents of Base Metal Steel Sheet

In the grain-oriented electrical steel sheet according to the present embodiment, for raising the magnetic flux density and lowering the iron loss, it is important to control the contents of the following elements in the composition of constituents contained in the base metal steel sheet of the grain-oriented electrical steel sheet.

C is an element effective for control of the microstructure until the completion of decarburization annealing in the manufacturing process. However, if the content of C is over 0.005%, magnetic aging is caused and the magnetic properties fall. Therefore, the content of C is 0.005% or less, preferably 0.003% or less.

On the other hand, the lower the content of C, the better, but even if reducing the content of C to less than 0.0001%, the effect of control of the microstructure becomes saturated and the manufacturing costs just swell. Therefore, the content of C may be made 0.0001% or more.

Si raises the electrical resistance of the steel sheet to thereby reduce the eddy current loss forming part of the iron loss. Si is preferably contained in the base metal steel sheet, by mass %, in a range of 2.5% or more and 4.5% or less, more preferably is contained in the base metal steel sheet in a range of 2.7% or more and 4.0% or less. If the content of Si is less than 2.5%, it becomes difficult to suppress eddy current loss of the grain-oriented electrical steel sheet, so this is not preferable. If the content of Si is over 4.5%, the workability of the grain-oriented electrical steel sheet falls, so this is not preferable.

Mn forms MnS or MnSe as an inhibitor governing the secondary recrystallization. Mn is preferably contained in the base metal steel sheet, by mass %, in a range of 0.01% or more and 0.15% or less, more preferably is contained in the base metal steel sheet in a range of 0.03% or more and 0.13% or less. If the content of Mn is less than 0.01%, the absolute amounts of MnS and MnSe causing secondary recrystallization become insufficient, so this is not preferable. If the content of Mn is over 0.15%, at the time of heating the slab, it becomes difficult for the Mn to dissolve and the precipitated size of the inhibitors coarsens, whereby the optimal size distribution of the inhibitors is impaired, so this is not preferable.

The balance of the chemical composition of the base metal steel sheet of the grain-oriented electrical steel sheet according to the present invention is comprised of Fe and impurities. Here, the impurities include ones unavoidably entering from the raw material ore, scrap, or manufacturing environment etc. when industrially manufacturing the base metal steel sheet, not limited to ones intentionally added, or the following elements etc. remaining in the steel without being completely removed in the purification annealing and allowed in a range not having a detrimental effect on the grain-oriented electrical steel sheet of the present invention. As the target of the upper limit of the total content of the impurities, 5% or so may be mentioned.

Further, the base metal steel sheet of the grain-oriented electrical steel sheet according to the present embodiment may contain one or more elements of any of Cu, Sn, Ni, Cr, and Sb as elements for stabilizing the secondary recrystallization. If the base metal steel sheet contains the above elements, it is possible to further decrease the value of the iron loss, so it is possible to obtain further excellent magnetic properties.

The contents of these elements may be, by mass %, 0.01% or more and 0.3% or less. If the contents of these elements are less than 0.01%, the effect of stabilization of the secondary recrystallization becomes difficult to sufficiently obtain, so this is not preferable. If the contents of these elements are over 0.3%, the effect of stabilization of the secondary recrystallization becomes saturated, so this is not preferable from the viewpoint of suppression of the increase of the manufacturing costs of the grain-oriented electrical steel sheet.

Primary Coating

Further, the inventors discovered that there is a close relationship between the adhesion of the primary coating and steel sheet and the distribution of Al oxides in the primary coating. That is, in the grain-oriented electrical steel sheet according to the present invention, the peak position $D_{Al}$ of the Al emission intensity obtained when analyzing the elements by glow discharge optical emission spectrometry from the surface of the primary coating in the thickness direction of the grain-oriented electrical steel sheet is arranged in a range of 2.0 to 12.0 μm from the surface of the primary coating in the thickness direction.

In grain-oriented electrical steel sheet, the interface of the primary coating and the steel sheet (base metal) has anchoring structures. Specifically, parts of the primary coating enter from the surface of the steel sheet to the inside of the steel sheet. The parts of the primary coating enter from the surface of the steel sheet to the inside of the steel sheet exhibiting a so-called "anchoring effect" and raise the adhesion of the primary coating with respect to the steel sheet. After that, in this Description, the parts of the primary coating entering from the surface of the steel sheet to the inside of the steel sheet are defined as "the roots of the primary coating".

In the regions where the roots of the primary coating deeply penetrate to the inside of the steel sheet, the main constituent of the roots of the primary coating is spinel ($MgAl_2O_4$), one type of Al oxide. The peak of the Al emission intensity obtained when analyzing the elements by glow discharge optical emission spectrometry is surmised to reflect the position of presence of the spinel.

The depth position of the peak of the Al emission intensity from the surface of the primary coating is defined as the Al peak position $D_{Al}$ (μm). If the Al peak position $D_{Al}$ is less than 2.0 μm, it means that the spinel is formed at a shallow position from the surface of the steel sheet. That is, it means that the roots of the primary coating are shallow. In this case, the adhesion of the primary coating is low, so this is not preferable. On the other hand, if the Al peak position $D_{Al}$ is over 12.0 μm, the roots of the primary coating excessively develop and the roots of the primary coating penetrate down to deep parts inside the steel sheet. In this case, the roots of the primary coating obstruct domain wall movement. As a result, the magnetic properties deteriorate, so this is not preferable.

If the Al peak position $D_{Al}$ is 2.0 to 12.0 μm, it is possible to maintain excellent magnetic properties while raising the adhesion of the coating. The Al peak position $D_{Al}$ is more preferably 3.0 to 10 μm.

The Al peak position $D_{Al}$ can be measured by the following method: The known glow discharge optical emission spectrometry (GDS method) is used to analyze the elements. Specifically, the area above the surface of the grain-oriented electrical steel sheet is made an Ar atmosphere. Voltage is applied to the grain-oriented electrical steel sheet to generate glow plasma and the surface layer of the steel sheet is sputtered to analyze it in the thickness direction.

Based on the emission spectral wavelengths distinctive to the elements generated upon excitation of atoms in the glow plasma, the Al contained in the surface layer of the steel sheet is identified. Furthermore, the emission intensities of the identified Al are plotted in the depth direction. Based on the plotted Al emission intensities, the Al peak position $D_{Al}$ is found.

The depth position of the primary coating from the surface in the elemental analysis can be calculated based on the sputter time. Specifically, the relationship between the sputter time and sputter depth in standard samples (below, referred to as the sample results) is found in advance. The sample results are used to convert the sputter time to the sputter depth. The converted sputter depth is defined as the depth position from the elemental analysis (Al analysis) (depth position from surface of primary coating). In the GDS method in the present invention, a commercially available high frequency glow discharge optical emission spectrometry apparatus can be used.

Note that, the final sputter depth at the time of sample measurement is preferably 1.5 times or more and 3 times or less of the Al peak position $D_{Al}$ for evaluating the Al peak position $D_{Al}$ without fluctuation. Note that, this measurement may be performed after dipping the steel sheet on which the insulating coating has been coated and baked in a high temperature alkali solution etc. to remove the insulating coating and rinsing the result.

In the grain-oriented electrical steel sheet according to the present invention, further, the number density ND of the Al oxides at the Al peak position $D_{Al}$ is 0.02 to 0.20/μm².

As explained above, the Al peak position $D_{Al}$ corresponds to the parts of the roots of the primary coating. At the roots of the primary coating, large amounts of the Al oxides of spinel ($MgAl_2O_4$) are present. Therefore, when defining the number density of the Al oxides at any region at the Al peak position $D_{Al}$ (for example, the bottom part discharge marks of the glow discharge) as the number density ND of Al oxides, the number density ND of Al oxides becomes an indicator showing the state of dispersion of the roots of the primary coating (spinel) at the surface layer of the steel sheet.

If the number density ND of Al oxides is less than 0.02/μm², the roots of the primary coating are not sufficiently formed. For this reason, the adhesion of the primary coating with respect to the steel sheet is low so this is not preferable. On the other hand, if the number density ND of Al oxides is over 0.20/μm², the roots of the primary coating excessively develop and the roots of the primary coating penetrate to deep parts inside the steel sheet. In this case, the roots of the primary coating obstruct secondary recrystallization and domain wall movement and the magnetic properties deteriorate, so this is not preferable. Therefore, the number density ND of Al oxides is 0.02 to 0.20/μm². The number density ND of Al oxides is more preferably 0.03 to 0.15/μm².

The number density ND of Al oxides can be found by the following method. A glow discharge optical emission spectrometry apparatus is used for glow discharge down to the Al peak position $D_{Al}$. In the discharge marks at the Al peak position $D_{Al}$, any 30 μm×50 μm or more region (observed region) is analyzed for elements by energy dispersive X-ray spectrometer (EDS) to identify the Al oxides in the observed region. Specifically, regions in which the intensity of a characteristic X-ray of O of 50% or more of the maximum intensity of the characteristic X-ray of O in the observed region is analyzed are identified as oxides. In the identified oxide regions, a region in which the intensity of a characteristic X-ray of Al of 30% or more of the maximum intensity of the characteristic X-ray of Al is analyzed is identified as aluminum oxide. The identified Al oxide is mainly spinel. In addition, there is a possibility of it being a silicate including other alkali earth metals and Al in high concentrations. The number of the identified Al oxides is counted and the following formula is used to find the number density ND of Al oxides (/μm²).

ND=number of identified Al oxides/area of observed region

Further, the inventors discovered that part of the sulfur elements contained in the sulfate or sulfide used for inhibitor control in the process of secondary recrystallization reacts with the rare earth metals or alkali earth metals etc. contained in the annealing separator and remains in the primary coating or the steel sheet or the interface of the same even after the finish annealing.

That is, in the grain-oriented electrical steel sheet according to the present invention, when analyzing the elements from the surface of the primary coating in the thickness direction of the grain-oriented electrical steel sheet by glow discharge optical emission spectrometry, the obtained peak position $D_S$ of the S emission intensity is arranged in a range of 1.0 to 10.0 μm from the surface of the primary coating in the thickness direction and $D_S<D_{Al}$. Preferably, the peak position $D_S$ of the S emission intensity is arranged in a range of 1.0 to 6.0 μm from the surface of the primary coating in the thickness direction and $D_S<D_{Al}$.

The sulfur compounds contained in the annealing separator break down in the process of secondary recrystallization and the sulfur penetrates into (sulfurizes) the steel sheet and forms MnS in the steel whereby the inhibitor strength near the surface layer is improved. In the process of temperature rise of the primary recrystallization annealing, if the average rate of temperature rise Va2 between 550° C. and 700° C. is 400° C./s or more and the average rate of temperature rise Va3 between 700° C. and the end of temperature rise satisfies Va3≤Va2, in the succeeding decarburization annealing, formation of an internal oxide layer is promoted, the interface of the internal oxide layer and the base iron forms a path for sulfur diffusion, and, in the process of temperature rise of the finish annealing, it is inferred that penetration of sulfur from the annealing separator is promoted. Further, the rate of release of moisture from the annealing separator from room temperature to 700° C. in the process of temperature rise of the finish annealing also influences the sulfurization. By suitable additional oxidation in the process of temperature rise of the finish annealing, it is guessed that the path for diffusion of sulfur from the surface of the steel sheet to the inside layer side is maintained. However, the broken down sulfur does not completely penetrate into the steel sheet. Part remains in the primary coating or at the interface of the primary coating and the steel sheet or at the extreme surface layer part of the steel sheet where it forms sulfides. These sulfides are inevitably formed when realizing sulfurization in the process of secondary recrystallization. The location where the most sulfides are formed is at the surface layer side from the "roots of the primary coating". Therefore, when analyzing the elements from the surface of the primary coating in the thickness direction of the grain-oriented electrical steel sheet by the glow discharge optical emission spectrometry method, the peak position $D_S$ of the S emission intensity is arranged in the range of 1.0 to 10.0 μm from the surface of the primary coating in the thickness direction and $D_S<D_{Al}$.

In the grain-oriented electrical steel sheet according to the present embodiment, further, the value of the magnetic flux density B8 may also be controlled. Specifically, in the grain-oriented electrical steel sheet according to the present embodiment, the value of the magnetic flux density B8 is preferably 1.92 T or more while 1.93 T or more is more preferable. Here, the value of the magnetic flux density B8 is the magnetic flux density when applying a magnetic field of 800 A/m at 50 Hz to the grain-oriented electrical steel sheet. If the value of the magnetic flux density B8 is less than 1.92 T, the value of the iron loss of the grain-oriented electrical steel sheet (in particular, the hysteresis loss) ends up becoming larger, so this is not preferable. The upper limit of the value of the magnetic flux density B8 is not particularly limited, but realistically may, for example, be 2.0 T. Note that, the magnetic flux density and other magnetic properties of the grain-oriented electrical steel sheet can be measured by known methods. For example, the magnetic properties of the grain-oriented electrical steel sheet can be measured using a method based on an Epstein test prescribed in JIS C2550, the single sheet magnetic property test method (single sheet tester: SST) prescribed in JIS C2556, etc. Note that, when the steel ingot was formed by a vacuum melting furnace etc. in R&D, it is difficult to obtain a test piece of a size equal to actual manufacture. In this case, for example, a test piece may be taken to give a width of 60 mm×length of 300 mm and measured based on the single sheet magnetic property test method. Furthermore, a correction coefficient may be applied to the obtained results so that measurement values equivalent to the method based on the Epstein test are obtained. In the present embodiment, measurement was conducted by a measurement method based on the single sheet magnetic property test method.

Above, grain-oriented electrical steel sheet according to the present embodiment was explained. The grain-oriented electrical steel sheet according to the present embodiment can be manufactured by the method for manufacturing grain-oriented electrical steel sheet of the present embodiment. However, it is not limited to just this method.

EXAMPLES

Below, while showing examples, a method for manufacturing grain-oriented electrical steel sheet and grain-oriented electrical steel sheet according to one embodiment of the present invention will be explained more specifically. Note that, the examples shown below are merely illustrations of the grain-oriented electrical steel sheet according to the present embodiment. The grain-oriented electrical steel sheet according to the present embodiment is not limited to the examples shown below.

Example 1

First, a steel ingot was prepared containing, by mass %, C: 0.08%, Si: 3.3%, Mn: 0.08%, S: 0.024%, acid soluble Al: 0.03%, N: 0.009%, and Bi: 0.03% and having a balance of Fe and impurities. The steel ingot was annealed at 1350° C. for 1 hour, then was hot rolled to thereby obtain a thickness 2.3 mm hot rolled steel sheet. The obtained hot rolled steel sheet was annealed at a peak temperature of 1100° C. for 140 seconds, pickled, then cold rolled to obtain a thickness 0.23 mm cold rolled steel sheet.

Next, the obtained cold rolled steel sheet was raised in temperature under conditions of an average rate of temperature rise Va1 between 25° C. and 550° C., an average rate of temperature rise Va2 between 550° C. and 700° C., an average rate of temperature rise Va3 between 700° C. and the end of temperature rise, and the end temperature of temperature rise shown in Table 1, then was annealed by primary recrystallization annealing in a wet hydrogen atmosphere at 850° C. for 180 seconds. Next, the surface of the steel sheet after the primary recrystallization annealing was coated with the annealing separator containing MgO in the state of the aqueous slurry and dried. The amount of deposition of the annealing separator on the surface of the steel sheet after drying was made 8 g/m² per side of the steel sheet. After that, the steel sheet was finish annealed and the steel sheet after the finish annealing was rinsed. Here, the contents of the annealing separator other than MgO were made $TiO_2$ of 5% and $La_2O_3$ converted to La of 2% when defining the content of MgO as 100% by mass % and a balance of the compounds of the conditions shown in Table 1. The rate of release of moisture from the annealing separator between 25° C. and 700° C. in the process of temperature rise of the finish annealing was made 3.0%, the average rate of temperature rise between 25° C. and 600° C. in the process of temperature rise of the finish annealing was made 100° C./h, the average rate of temperature rise between 600° C. and 900° C. was made 20° C./h, the average rate of temperature rise Vf between 900° C. and 1100° C. was made 5° C./h, the average rate of temperature rise between 1100° C. and 1200° C. was made 10° C./h, and purification annealing was performed at 1200° C. for 30 hours. After that, the surface of the steel sheet was coated with an insulating coating having aluminum phosphate and colloidal silica as main ingredients, then flattening annealing was performed for the purpose of baking on the insulating coating and flattening the steel sheet.

Samples of the grain-oriented electrical steel sheet obtained by the above were cut and annealed to relieve stress, then the method of measurement of magnetic properties of single sheets of a sample size of 60 mm×300 mm (based on the method described in JIS C2556) was used to measure the value of the magnetic flux density B8 of grain-oriented electrical steel sheets according to the invention examples and comparative examples. Here, the B8 value is the magnetic flux density of steel sheet when exciting grain-oriented electrical steel sheet at 50 Hz by 800 A/m. In the present invention, the average value of five samples was used.

Furthermore, the above samples were cut into 30 mm widths and subjected to 10 mmφ flex tests. Here, three test pieces were tested by flex tests to find the average value of the area ratio of peeling.

The test method was as follows. The test piece of each numbered test was subjected to a flex test by a rate of curvature of 10 mm. The flex test was performed by using a cylindrical mandrel bend tester, setting the tester at the test piece so that the axial direction of the cylinder matched the width direction of the test piece, and bending the test piece up to 180°. The surface of the test piece after the flex test was examined and the total area of the regions from which the primary coating peeled off was found. The following formula was used to find the area ratio of peeling.

Area ratio of peeling=total area of regions from which primary coating has peeled off/area of surface of test piece×100

Here, conditions where the value of the magnetic flux density B8 of the grain-oriented electrical steel sheet was 1.92 T or more and the area ratio of peeling in the 10 mmφ flex test was 10% or less were judged as good (B). Further, conditions where the conditions of B were satisfied and the value of the magnetic flux density B8 was 1.93 T or more were judged as excellent (A). Further, conditions other than the above were judged as poor (C).

The manufacturing conditions, measurement results, and evaluations of the above invention examples and comparative examples are shown in Table 1. Furthermore, the contents of Si and Mn in the base metal steel sheet after the final process were analyzed by high frequency inductive coupling plasma emission spectroscopy. As a result, in all samples described in Example 1, the content of Si in the base metal steel sheet after the final process was 3.2% and the content of Mn in the base metal steel sheet after the final process was 0.08%. Further, the content of C in the base metal steel sheet after the final process was measured using a carbon/sulfur analyzer. As a result, in all samples described in Example 1, the content of carbon in the base metal steel sheet after the final process was 0.002%.

TABLE 1

| Condition | Average rate of temperature rise of primary recrystallization annealing | | | End temperature of temperature rise | Alkali earth metal compound in annealing separator | | Converted alkali earth metal content in annealing separator | Converted S content in annealing separator | Magnetic flux density | Area ratio of peeling | Evaluation | Remarks |
|---|---|---|---|---|---|---|---|---|---|---|---|---|
| | Va1 (°C./s) | Va2 (°C./s) | Va3 (°C./s) | (°C.) | Compound | Content (%) | (%) | (%) | B8 value (T) | (%) | | |
| A1 | 400 | 400 | 400 | 850 | $CaSO_4 \cdot 0.5H_2O$ | 0.4 | 0.11 | 0.09 | 1.905 | 9 | C | Comp. ex. |
| A2 | 400 | 400 | 400 | 850 | $CaSO_4 \cdot 0.5H_2O$ | 1 | 0.28 | 0.22 | 1.924 | 8 | B | Inv. ex. |
| A3 | 400 | 400 | 400 | 850 | $CaSO_4 \cdot 0.5H_2O$ | 1.2 | 0.33 | 0.27 | 1.925 | 8 | B | Inv. ex. |
| A4 | 400 | 400 | 400 | 850 | $CaSO_4 \cdot 0.5H_2O$ | 2 | 0.55 | 0.44 | 1.927 | 7 | B | Inv. ex. |
| A5 | 400 | 400 | 400 | 850 | $CaSO_4 \cdot 0.5H_2O$ | 3 | 0.83 | 0.66 | 1.928 | 6 | B | Inv. ex. |
| A6 | 400 | 400 | 400 | 850 | $CaSO_4 \cdot 0.5H_2O$ | 6 | 1.66 | 1.33 | 1.929 | 5 | B | Inv. ex. |
| A7 | 400 | 400 | 400 | 850 | $CaSO_4 \cdot 0.5H_2O$ | 7 | 1.93 | 1.55 | 1.894 | 5 | C | Comp. ex. |
| A8 | 700 | 700 | 400 | 850 | $CaSO_4 \cdot 0.5H_2O$ | 0.4 | 0.11 | 0.09 | 1.903 | 9 | C | Comp. ex. |
| A9 | 700 | 700 | 400 | 850 | $CaSO_4 \cdot 0.5H_2O$ | 1 | 0.28 | 0.22 | 1.931 | 8 | A | Inv. ex. |
| A10 | 700 | 700 | 400 | 850 | $CaSO_4 \cdot 0.5H_2O$ | 1.2 | 0.33 | 0.27 | 1.932 | 7 | A | Inv. ex. |
| A11 | 700 | 700 | 400 | 850 | $CaSO_4 \cdot 0.5H_2O$ | 2 | 0.55 | 0.44 | 1.932 | 7 | A | Inv. ex. |
| A12 | 700 | 700 | 400 | 850 | $CaSO_4 \cdot 0.5H_2O$ | 3 | 0.83 | 0.66 | 1.934 | 6 | A | Inv. ex. |
| A13 | 700 | 700 | 400 | 850 | $CaSO_4 \cdot 0.5H_2O$ | 6 | 1.66 | 1.33 | 1.935 | 5 | A | Inv. ex. |
| A14 | 700 | 700 | 400 | 850 | $CaSO_4 \cdot 0.5H_2O$ | 7 | 1.93 | 1.55 | 1.898 | 5 | C | Comp. ex. |
| A15 | 1000 | 1000 | 400 | 850 | $CaSO_4 \cdot 0.5H_2O$ | 0.4 | 0.11 | 0.09 | 1.903 | 9 | C | Comp. ex. |
| A16 | 1000 | 1000 | 400 | 850 | $CaSO_4 \cdot 0.5H_2O$ | 1 | 0.28 | 0.22 | 1.903 | 8 | C | Comp. ex. |
| A17 | 1000 | 1000 | 400 | 850 | $CaSO_4 \cdot 0.5H_2O$ | 1.2 | 0.33 | 0.27 | 1.933 | 7 | A | Inv. ex. |
| A18 | 1000 | 1000 | 400 | 850 | $CaSO_4 \cdot 0.5H_2O$ | 2 | 0.55 | 0.44 | 1.934 | 7 | A | Inv. ex. |
| A19 | 1000 | 1000 | 400 | 850 | $CaSO_4 \cdot 0.5H_2O$ | 3 | 0.83 | 0.66 | 1.934 | 6 | A | Inv. ex. |
| A20 | 1000 | 1000 | 400 | 850 | $CaSO_4 \cdot 0.5H_2O$ | 6 | 1.66 | 1.33 | 1.934 | 5 | A | Inv. ex. |
| A21 | 1000 | 1000 | 400 | 850 | $CaSO_4 \cdot 0.5H_2O$ | 7 | 1.93 | 1.55 | 1.899 | 5 | C | Comp. ex. |
| A22 | 2000 | 2000 | 400 | 850 | $CaSO_4 \cdot 0.5H_2O$ | 0.4 | 0.11 | 0.09 | 1.897 | 9 | C | Comp. ex. |
| A23 | 2000 | 2000 | 400 | 850 | $CaSO_4 \cdot 0.5H_2O$ | 1 | 0.28 | 0.22 | 1.901 | 8 | C | Comp. ex. |
| A24 | 2000 | 2000 | 400 | 850 | $CaSO_4 \cdot 0.5H_2O$ | 1.2 | 0.33 | 0.27 | 1.911 | 7 | C | Comp. ex. |
| A25 | 2000 | 2000 | 400 | 850 | $CaSO_4 \cdot 0.5H_2O$ | 2 | 0.55 | 0.44 | 1.915 | 6 | C | Comp. ex. |
| A26 | 2000 | 2000 | 400 | 850 | $CaSO_4 \cdot 0.5H_2O$ | 3 | 0.83 | 0.66 | 1.936 | 6 | A | Inv. ex. |
| A27 | 2000 | 2000 | 400 | 850 | $CaSO_4 \cdot 0.5H_2O$ | 6 | 1.66 | 1.33 | 1.936 | 5 | A | Inv. ex. |
| A28 | 2000 | 2000 | 400 | 850 | $CaSO_4 \cdot 0.5H_2O$ | 7 | 1.93 | 1.55 | 1.893 | 5 | C | Comp. ex. |
| A29 | 100 | 100 | 100 | 850 | $CaSO_4 \cdot 0.5H_2O$ | 3 | 0.83 | 0.66 | 1.909 | 6 | C | Comp. ex. |
| A30 | 400 | 700 | 400 | 850 | $CaSO_4 \cdot 0.5H_2O$ | 3 | 0.83 | 0.66 | 1.934 | 6 | A | Inv. ex. |
| A31 | 1000 | 700 | 400 | 850 | $CaSO_4 \cdot 0.5H_2O$ | 3 | 0.83 | 0.66 | 1.915 | 6 | C | Comp. ex. |
| A32 | 400 | 700 | 700 | 850 | $CaSO_4 \cdot 0.5H_2O$ | 3 | 0.83 | 0.66 | 1.936 | 6 | A | Inv. ex. |
| A33 | 400 | 700 | 1000 | 850 | $CaSO_4 \cdot 0.5H_2O$ | 3 | 0.83 | 0.66 | 1.908 | 6 | C | Comp. ex. |
| A34 | 1000 | 700 | 1000 | 850 | $CaSO_4 \cdot 0.5H_2O$ | 3 | 0.83 | 0.66 | 1.906 | 6 | C | Comp. ex. |

TABLE 1-continued

| Condition | Average rate of temperature rise of primary recrystallization annealing | | | End temperature of temperature rise (° C.) | Alkali earth metal compound in annealing separator | | Converted alkali earth metal content in annealing separator (%) | Converted S content in annealing separator (%) | Magnetic flux density B8 value (T) | Area ratio of peeling (%) | Evaluation | Remarks |
|---|---|---|---|---|---|---|---|---|---|---|---|---|
| | Va1 (° C./s) | Va2 (° C./s) | Va3 (° C./s) | | Compound | Content (%) | | | | | | |
| A35 | 700 | 700 | 400 | 800 | CaSO$_4$ · 0.5H$_2$O | 3 | 0.83 | 0.66 | 1.932 | 6 | A | Inv. ex. |
| A36 | 700 | 700 | 400 | 900 | CaSO$_4$ · 0.5H$_2$O | 3 | 0.83 | 0.66 | 1.935 | 6 | A | Inv. ex. |

Referring to the results of Table 1, it was learned that grain-oriented electrical steel sheets satisfying the conditions of the present embodiment were judged as good. Further, it was learned that in invention examples using conditions of the average rate of temperature rise Va2 between 550° C. and 700° C. in the process of temperature rise of the primary recrystallization annealing of 700° C./s or more, the value of the magnetic flux density B8 becomes 1.93 T or more, so they are judged excellent.

Here, a graph plotting the results shown by the conditions of A1 to A28 of Table 1 taking the average rate of temperature rise Va2 (° C./s) between 550° C. to 700° C. in the process of temperature rise of the primary recrystallization annealing along the abscissa and the sulfates or sulfides in the annealing separator converted to the sulfur element as A % along the ordinate is shown in The Figure. As shown in The Figure, if plotting the invention examples by white circles and the comparative examples by intersecting points, it was learned that there is the relationship of the following formula 1 prescribed under the conditions according to the present embodiment between the average rate of temperature rise Va2 (° C./s) between 550° C. and 700° C. in the process of temperature rise of the primary recrystallization annealing and the sulfates or sulfides in the annealing separator converted to sulfur element as A (%);

$$(0.00025 \times Va2) \leq A \leq 1.5 \quad \text{formula 1}$$

Example 2

First, a steel ingot was prepared containing, by mass %, C: 0.08%, Si: 3.2%, Mn: 0.08%, S: 0.003%, Se: 0.0019%, acid soluble Al: 0.03%, N: 0.009%, and Bi: 0.02% and having a balance of Fe and impurities. The steel ingot was annealed at 1380° C. for 1 hour, then was hot rolled to thereby obtain a thickness 2.3 mm hot rolled steel sheet. The obtained hot rolled steel sheet was annealed at a peak temperature of 1100° C. for 140 seconds, pickled, then cold rolled to obtain a thickness 0.23 mm cold rolled steel sheet.

Next, the obtained cold rolled steel sheet was raised in temperature under conditions of an average rate of temperature rise Va1 between 25° C. and 550° C. of 100° C./s and an average rate of temperature rise Va2 between 550° C. and 700° C. of the conditions shown in Table 2, then was raised in temperature by an average rate of temperature rise Va3 between 700° C. and 850° C. of 100° C./s, then was annealed by primary recrystallization annealing in a wet hydrogen atmosphere at 850° C. for 180 seconds. Next, the surface of the steel sheet after the primary recrystallization annealing was coated with the annealing separator containing MgO in the state of the aqueous slurry and dried. The amount of deposition of the annealing separator on the surface of the steel sheet after drying was made 5 g/m$^2$ per side of the steel sheet. After that, the steel sheet was finish annealed and the steel sheet after the finish annealing was rinsed. Here, the contents of the annealing separator other than MgO were made TiO$_2$ of 5% and CeO$_2$ converted to Ce of 2% when defining the content of MgO as 100% by mass % and a balance of the compounds of the conditions shown in Table 2. The rate of release of moisture from the annealing separator between 25° C. and 700° C. in the process of temperature rise of the finish annealing was made 1.5%, the average rate of temperature rise between 25° C. and 600° C. in the process of temperature rise of the finish annealing was made 100° C./h, the average rate of temperature rise between 600° C. and 900° C. was made 15° C./h, the average rate of temperature rise Vf between 900° C. and 1100° C. was made the condition shown in Table 2, the average rate of temperature rise between 1100° C. and 1200° C. was made 15° C./h, and purification annealing was performed at 1200° C. for 30 hours. After that, the surface of the steel sheet was coated with an insulating coating having aluminum phosphate and colloidal silica as main ingredients, then flattening annealing was performed for the purpose of baking on the insulating coating and flattening the steel sheet.

Samples of the grain-oriented electrical steel sheet obtained by the above were cut and annealed to relieve stress, then the method of measurement of magnetic properties of single sheets of a sample size of 60 mm×300 mm (based on the method described in JIS C2556) was used to measure the value of the magnetic flux density B8 of the grain-oriented electrical steel sheets according to the invention examples and comparative examples. Here, the B8 value is the magnetic flux density of steel sheet when exciting grain-oriented electrical steel sheet at 50 Hz by 800 A/m. In the present invention, the average value of five samples was used.

Furthermore, the above samples were cut into 30 mm widths and subjected to 10 mmφ flex tests. Here, three test pieces were tested by flex tests to find the average value of the area ratio of peeling. The test method was similar to Example 1.

Here, conditions where the value of the magnetic flux density B8 of the grain-oriented electrical steel sheet was 1.92 T or more and the area ratio of peeling in a 10 mmφ flex test was 10% or less were judged as good (B). Further, conditions where the conditions of B were satisfied and further the value of the magnetic flux density B8 was 1.93 T or more were judged as excellent (A). Further, conditions other than the above were judged as poor (C).

The manufacturing conditions, measurement results, and evaluations of the above invention examples and comparative examples are shown in Table 2. Furthermore, the contents of Si and Mn in the base metal steel sheet after the final process were analyzed by high frequency inductive coupling plasma emission spectroscopy. As a result, in all samples described in Example 2, the content of Si in the base metal steel sheet after the final process was 3.1% and the content of Mn in the base metal steel sheet after the final process was 0.08%. Further, the content of C in the base metal steel sheet after the final process was measured using a carbon/sulfur analyzer. As a result, in all samples described in Example 2, the content of carbon in the base metal steel sheet after the final process was 0.002%.

TABLE 2

| Condition | Average rate of temperature rise Va of primary recrystallization annealing (° C./s) | Compounds in annealing separator | | Converted alkali earth metal content in annealing separator (%) | Converted S. content in annealing separator (%) | Average rate of temperature rise Vf of finish annealing (° C./h) | Magnetic flux density B8 value (T) | Area ratio of peeling (%) | Evaluation | Remarks |
|---|---|---|---|---|---|---|---|---|---|---|
| | | $CaSO_4 \cdot 0.5H_2O$ content (%) | $MgSO_4$ content (%) | | | | | | | |
| B1 | 400 | 1 | 0 | 0.28 | 0.22 | 5 | 1.924 | 8 | B | Inv. ex. |
| B2 | 400 | 1 | 1 | 0.28 | 0.49 | 5 | 1.925 | 8 | B | Inv. ex. |
| B3 | 400 | 1 | 2 | 0.28 | 0.75 | 5 | 1.925 | 7 | B | Inv. ex. |
| B4 | 400 | 1 | 4 | 0.28 | 1.29 | 5 | 1.926 | 7 | B | Inv. ex. |
| B5 | 400 | 1 | 0 | 0.28 | 0.22 | 7.5 | 1.925 | 8 | B | Inv. ex. |
| B6 | 400 | 1 | 1 | 0.28 | 0.49 | 7.5 | 1.926 | 7 | B | Inv. ex. |
| B7 | 400 | 1 | 2 | 0.28 | 0.75 | 7.5 | 1.926 | 7 | B | Inv. ex. |
| B8 | 400 | 1 | 4 | 0.28 | 1.29 | 7.5 | 1.927 | 7 | B | Inv. ex. |
| B9 | 400 | 1 | 0 | 0.28 | 0.22 | 15 | 1.925 | 7 | B | Inv. ex. |
| B10 | 400 | 1 | 1 | 0.28 | 0.49 | 15 | 1.926 | 7 | B | Inv. ex. |
| B11 | 400 | 1 | 2 | 0.28 | 0.75 | 15 | 1.926 | 7 | B | Inv. ex. |
| B12 | 400 | 1 | 4 | 0.28 | 1.29 | 15 | 1.926 | 6 | B | Inv. ex. |
| B13 | 400 | 1 | 0 | 0.28 | 0.22 | 20 | 1.923 | 7 | B | Inv. ex. |
| B14 | 400 | 1 | 1 | 0.28 | 0.49 | 20 | 1.917 | 7 | C | Comp. ex. |
| B15 | 400 | 1 | 2 | 0.28 | 0.75 | 20 | 1.917 | 6 | C | Comp. ex. |
| B16 | 400 | 1 | 4 | 0.28 | 1.29 | 20 | 1.918 | 6 | C | Comp. ex. |
| B17 | 700 | 1 | 0 | 0.28 | 0.22 | 5 | 1.931 | 8 | A | Inv. ex. |
| B18 | 700 | 1 | 1 | 0.28 | 0.49 | 5 | 1.931 | 7 | A | Inv. ex. |
| B19 | 700 | 1 | 2 | 0.28 | 0.75 | 5 | 1.931 | 7 | A | Inv. ex. |
| B20 | 700 | 1 | 4 | 0.28 | 1.29 | 5 | 1.932 | 7 | A | Inv. ex. |
| B21 | 700 | 1 | 0 | 0.28 | 0.22 | 7.5 | 1.931 | 7 | A | Inv. ex. |
| B22 | 700 | 1 | 1 | 0.28 | 0.49 | 7.5 | 1.932 | 7 | A | Inv. ex. |
| B23 | 700 | 1 | 2 | 0.28 | 0.75 | 7.5 | 1.933 | 7 | A | Inv. ex. |
| B24 | 700 | 1 | 4 | 0.28 | 1.29 | 7.5 | 1.933 | 6 | A | Inv. ex. |
| B25 | 700 | 1 | 0 | 0.28 | 0.22 | 15 | 1.932 | 7 | A | Inv. ex. |
| B26 | 700 | 1 | 1 | 0.28 | 0.49 | 15 | 1.932 | 7 | A | Inv. ex. |
| B27 | 700 | 1 | 2 | 0.28 | 0.75 | 15 | 1.933 | 6 | A | Inv. ex. |
| B28 | 700 | 1 | 4 | 0.28 | 1.29 | 15 | 1.934 | 6 | A | Inv. ex. |
| B29 | 700 | 1 | 0 | 0.28 | 0.22 | 20 | 1.931 | 7 | A | Inv. ex. |
| B30 | 700 | 1 | 1 | 0.28 | 0.49 | 20 | 1.916 | 7 | C | Comp. ex. |
| B31 | 700 | 1 | 2 | 0.28 | 0.75 | 20 | 1.917 | 6 | C | Comp. ex. |
| B32 | 700 | 1 | 4 | 0.28 | 1.29 | 20 | 1.917 | 6 | C | Comp. ex. |
| B33 | 1000 | 1 | 0 | 0.28 | 0.22 | 5 | 1.917 | 8 | C | Comp. ex. |
| B34 | 1000 | 1 | 1 | 0.28 | 0.49 | 5 | 1.933 | 7 | A | Inv. ex. |
| B35 | 1000 | 1 | 2 | 0.28 | 0.75 | 5 | 1.934 | 7 | A | Inv. ex. |
| B36 | 1000 | 1 | 4 | 0.28 | 1.29 | 5 | 1.934 | 6 | A | Inv. ex. |
| B37 | 1000 | 1 | 0 | 0.28 | 0.22 | 7.5 | 1.912 | 7 | C | Comp. ex. |
| B38 | 1000 | 1 | 1 | 0.28 | 0.49 | 7.5 | 1.934 | 7 | A | Inv. ex. |
| B39 | 1000 | 1 | 2 | 0.28 | 0.75 | 7.5 | 1.934 | 6 | A | Inv. ex. |
| B40 | 1000 | 1 | 4 | 0.28 | 1.29 | 7.5 | 1.935 | 6 | A | Inv. ex. |
| B41 | 1000 | 1 | 0 | 0.28 | 0.22 | 15 | 1.913 | 7 | C | Comp. ex. |
| B42 | 1000 | 1 | 1 | 0.28 | 0.49 | 15 | 1.934 | 7 | A | Inv. ex. |
| B43 | 1000 | 1 | 2 | 0.28 | 0.75 | 15 | 1.935 | 6 | A | Inv. ex. |
| B44 | 1000 | 1 | 4 | 0.28 | 1.29 | 15 | 1.935 | 5 | A | Inv. Ex. |
| B45 | 1000 | 1 | 0 | 0.28 | 0.22 | 20 | 1.912 | 7 | C | Comp. ex. |
| B46 | 1000 | 1 | 1 | 0.28 | 0.49 | 20 | 1.913 | 6 | C | Comp. ex. |
| B47 | 1000 | 1 | 2 | 0.28 | 0.75 | 20 | 1.913 | 6 | C | Comp. ex. |
| B48 | 1000 | 1 | 4 | 0.28 | 1.29 | 20 | 1.914 | 6 | C | Comp. ex. |
| B49 | 2000 | 1 | 0 | 0.28 | 0.22 | 5 | 1.901 | 8 | C | Comp. ex. |
| B50 | 2000 | 1 | 1 | 0.28 | 0.49 | 5 | 1.905 | 7 | C | Comp. ex. |
| B51 | 2000 | 1 | 2 | 0.28 | 0.75 | 5 | 1.936 | 7 | A | Inv. ex. |
| B52 | 2000 | 1 | 4 | 0.28 | 1.29 | 5 | 1.936 | 6 | A | Inv. ex. |
| B53 | 2000 | 1 | 0 | 0.28 | 0.22 | 7.5 | 1.897 | 7 | C | Comp. ex. |
| B54 | 2000 | 1 | 1 | 0.28 | 0.49 | 7.5 | 1.907 | 7 | C | Comp. ex. |
| B55 | 2000 | 1 | 2 | 0.28 | 0.75 | 7.5 | 1.937 | 6 | A | Inv. ex. |
| B56 | 2000 | 1 | 4 | 0.28 | 1.29 | 7.5 | 1.937 | 6 | A | Inv. ex. |
| B57 | 2000 | 1 | 0 | 0.28 | 0.22 | 15 | 1.897 | 7 | C | Comp. ex. |
| B58 | 2000 | 1 | 1 | 0.28 | 0.49 | 15 | 1.909 | 7 | C | Comp. ex. |
| B59 | 2000 | 1 | 2 | 0.28 | 0.75 | 15 | 1.937 | 6 | A | Inv. ex. |
| B60 | 2000 | 1 | 4 | 0.28 | 1.29 | 15 | 1.937 | 5 | A | Inv. ex. |
| B61 | 2000 | 1 | 0 | 0.28 | 0.22 | 20 | 1.896 | 7 | C | Comp. ex. |
| B62 | 2000 | 1 | 1 | 0.28 | 0.49 | 20 | 1.905 | 6 | C | Comp. ex. |
| B63 | 2000 | 1 | 2 | 0.28 | 0.75 | 20 | 1.912 | 6 | C | Comp. ex. |
| B64 | 2000 | 1 | 4 | 0.28 | 1.29 | 20 | 1.913 | 6 | C | Comp. ex. |

If referring to the results of Table 2, it was learned that grain-oriented electrical steel sheets satisfying the conditions of the present embodiment were judged as good. Further, in invention examples where the average rate of temperature rise Va2 between 550° C. and 700° C. in the process of temperature rise of the primary recrystallization annealing was 700° C./s or more, the value of the magnetic flux density B8 became 1.93 T or more, so the examples were judged excellent.

Here, the fact that the average rate of temperature rise Va2 (° C./s) between 550° C. and 700° C. in the process of temperature rise of the primary recrystallization annealing and the sulfates or sulfides in the annealing separator converted to sulfur element as A (%) are in the relationship of the following formula 1 prescribed by the conditions according to the present embodiment is learned from Example 1. It was learned that this is also satisfied in the invention example of Example 2. Further, it was learned that the sulfates or sulfides in the annealing separator converted to sulfur element as A (%) and the average rate of temperature rise Vf (° C./h) between 900° C. and 1100° C. in the process of temperature rise of the finish annealing are in the relationship of the following formula 2 prescribed by the conditions according to the present embodiment.

$(0.00025 \times Va2) \leq A \leq 1.5$     formula 1

$5 \leq Vf \leq (21 - 4 \times A)$     formula 2

Example 3

First, a steel ingot was prepared containing, by mass %, C: 0.08%, Si: 3.3%, Mn: 0.08%, S: 0.025%, acid soluble Al: 0.03%, N: 0.008%, and Bi: 0.02% and having a balance of Fe and impurities. The steel ingot was annealed at 1380° C. for 1 hour, then was hot rolled to thereby obtain a thickness 2.3 mm hot rolled steel sheet. The obtained hot rolled steel sheet was annealed at a peak temperature of 1100° C. for 140 seconds, pickled, then cold rolled to obtain a thickness 0.23 mm cold rolled steel sheet.

Next, the obtained cold rolled steel sheet was raised in temperature under conditions of an average rate of temperature rise Va1 between 25° C. and 550° C. of 200° C./s and an average rate of temperature rise Va2 between 550° C. and 700° C. shown in Table 3, then was raised in temperature by an average rate of temperature rise Va3 between 700° C. and 850° C. of 200° C./s and was annealed by primary recrystallization annealing in a wet hydrogen atmosphere at 850° C. for 180 seconds. Next, the surface of the steel sheet after the primary recrystallization annealing was coated with the annealing separator containing MgO in the state of the aqueous slurry and dried. The amount of deposition of the annealing separator on the surface of the steel sheet after drying was made 7 g/m² per side of the steel sheet. After that, the steel sheet was finish annealed and the steel sheet after the finish annealing was rinsed. Here, the contents of the annealing separator other than MgO were a rare earth metal compound of Ce(OH)$_4$, an alkali earth metal compound of Sr(OH)$_2$, and a sulfur (S)-containing compound of MgSO$_4$ added to give the conditions shown in Table 3 when defining the MgO content as 100% by mass %. The rate of release of moisture from the annealing separator between 25° C. and 700° C. in the process of temperature rise of the finish annealing was made 2.5%, the average rate of temperature rise between 25° C. and 700° C. in the process of temperature rise of the finish annealing was made 100° C./h, the average rate of temperature rise between 700° C. and 900° C. was made 10° C./h, the average rate of temperature rise Vf between 900° C. and 1100° C. was made the conditions shown in Table 3, the average rate of temperature rise between 1100° C. and 1200° C. was made 15° C./h, and annealing was performed at 1200° C. for 20 hours. After that, the surface of the steel sheet was coated with an insulating coating having aluminum phosphate and colloidal silica as main ingredients, then flattening annealing was performed for the purpose of baking on the insulating coating and flattening the steel sheet.

Samples of the oriented electrical steel sheet obtained by the above were cut and annealed to relieve stress, then the method of measurement of magnetic properties of single sheets of a sample size of 60 mm×300 mm (based on the method described in JIS C2556) was used to measure the value of the magnetic flux density B8 of the grain-oriented electrical steel sheets according to the invention examples and comparative examples. Here, the B8 value is the magnetic flux density of steel sheet when exciting grain-oriented electrical steel sheet at 50 Hz by 800 A/m. In the present invention, the average value of five samples was used.

Furthermore, samples of the grain-oriented electrical steel sheet were treated by laser to control the magnetic domains. The interval of firing in the longitudinal direction of the steel sheet was made 5 mm, the firing direction of the laser was made vertical to the longitudinal direction of the steel sheet, and the firing energy density Ua was made 2.0 mmJ/mm². The lasered samples were measured for iron loss $W_{17/50}$ using the method of measurement of magnetic properties of single sheets of a sample size of 60 mm×300 mm (based on the method described in JIS C2556). Here, $W_{17/50}$ is the value of iron loss when exciting grain-oriented electrical steel sheet at 50 Hz to 1.7 T. In the present invention, the average value of five samples was used.

Furthermore, the above samples were cut into 30 mm widths and subjected to 10 mmφ flex tests. Here, three test pieces were tested by flex tests to find the average value of the area ratio of peeling. The test method was similar to Example 1.

Here, the steel sheets rinsed after the finish annealing were measured using glow discharge optical emission spectrometry (GDS method) for the Al peak position $D_{Al}$, the number density ND of Al oxides, and the S peak position $D_S$.

The method of measurement of the Al peak position $D_{Al}$ and the S peak position $D_S$ was follows. The surface layer (primary coating) of the grain-oriented electrical steel sheet was analyzed for elements using the GDS method from the surface layer in the depth direction in a range of 100 μm to identify the Al and S contained at the various depth positions in the surface layer. The emission intensities of the identified Al and S were plotted from the surface in the depth direction. The Al peak position $D_{Al}$ and S peak position $D_S$ were found based on a graph of the plotted Al emission intensities and S emission intensities.

The number density ND of Al oxides was found as follows: A glow discharge optical emission spectrometry apparatus was used for glow discharge down to the Al peak position $D_{Al}$. In the discharge marks at the Al peak position $D_{Al}$, any 30 μm×50 μm or more region (observed region) was analyzed for elements by energy dispersive X-ray spectrometer (EDS) to identify the Al oxides in the observed region. In the precipitates in the observed region, precipitates containing Al and O were identified as Al oxides. The number of the identified Al oxides was counted and the following formula was used to find the number density ND of Al oxides (/μm²).

ND=number of identified Al oxides/area of observed region

Here, conditions where the value of the magnetic flux density B8 of the grain-oriented electrical steel sheet was 1.92 T or more, the iron loss $W_{17/50}$ after laser control of the magnetic domains was 0.850 W/kg or less, the area ratio of peeling in a 10 mmφ flex test was 10% or less, the Al peak position $D_{Al}$ was present in a range of 2.0 to 12.0 μm, the number density ND of Al oxides was 0.02 to 0.20/μm², the S peak position $D_S$ was present in a range of 1.0 to 10.0 μm, and $D_S<D_{Al}$ were judged as good (B). Further, conditions where the conditions of B were satisfied and further the value of the magnetic flux density B8 was 1.93 T or more were judged as excellent (A). Further, conditions other than the above were judged as poor (C).

The manufacturing conditions, measurement results, and evaluations of the above invention examples and comparative examples are shown in Table 4. Furthermore, the contents of Si and Mn in the base metal steel sheet after the final process were analyzed by high frequency inductive coupling plasma emission spectroscopy. As a result, in all samples described in Example 3, the content of Si in the base metal steel sheet after the final process was 3.2% and the content of Mn in the base metal steel sheet after the final process was 0.08%. Further, the content of C in the base metal steel sheet after the final process was measured using a carbon/sulfur analyzer. As a result, in all samples described in Example 3, the content of carbon in the base metal steel sheet after the final process was 0.002%.

TABLE 3

| Condition | Average rate of temperature rise Va of primary recrystallization annealing (° C./s) | Annealing separator | | | | Average rate of temperature rise Vf of finish annealing (° C./h) |
|---|---|---|---|---|---|---|
| | | TiO₂ content (%) | Converted rare earth metal content (%) | Converted alkali earth metal content (%) | Converted S content (%) | |
| C1 | 400 | 0.2 | 0.05 | 0.05 | 0.8 | 7.5 |
| C2 | 400 | 0.5 | 0.05 | 0.05 | 0.8 | 7.5 |
| C3 | 400 | 0.5 | 0.1 | 0.05 | 0.8 | 7.5 |
| C4 | 400 | 0.5 | 0.05 | 0.1 | 0.8 | 7.5 |
| C5 | 400 | 0.5 | 0.1 | 0.1 | 0.8 | 7.5 |
| C6 | 400 | 5 | 2 | 1.1 | 0.8 | 7.5 |
| C7 | 400 | 5 | 10 | 10 | 0.8 | 7.5 |
| C8 | 400 | 5 | 11 | 1.1 | 0.8 | 7.5 |
| C9 | 400 | 5 | 2 | 11 | 0.8 | 7.5 |
| C10 | 700 | 0.2 | 0.05 | 0.05 | 0.8 | 7.5 |
| C11 | 700 | 0.5 | 0.05 | 0.05 | 0.8 | 7.5 |
| C12 | 700 | 0.5 | 0.1 | 0.05 | 0.8 | 7.5 |
| C13 | 700 | 0.5 | 0.05 | 0.1 | 0.8 | 7.5 |
| C14 | 700 | 0.5 | 0.1 | 0.1 | 0.8 | 7.5 |
| C15 | 700 | 5 | 2 | 1.1 | 0.8 | 7.5 |
| C16 | 700 | 5 | 10 | 10 | 0.8 | 7.5 |
| C17 | 700 | 5 | 11 | 1.1 | 0.8 | 7.5 |
| C18 | 700 | 5 | 2 | 11 | 0.8 | 7.5 |
| C19 | 1000 | 0.2 | 0.05 | 0.05 | 0.8 | 7.5 |
| C20 | 1000 | 0.5 | 0.05 | 0.05 | 0.8 | 7.5 |
| C21 | 1000 | 0.5 | 0.1 | 0.05 | 0.8 | 7.5 |
| C22 | 1000 | 0.5 | 0.05 | 0.1 | 0.8 | 7.5 |
| C23 | 1000 | 0.5 | 0.1 | 0.1 | 0.8 | 7.5 |
| C24 | 1000 | 5 | 2 | 1.1 | 0.8 | 7.5 |
| C25 | 1000 | 5 | 10 | 10 | 0.8 | 7.5 |
| C26 | 1000 | 5 | 11 | 1.1 | 0.8 | 7.5 |
| C27 | 1000 | 5 | 2 | 11 | 0.8 | 7.5 |
| C28 | 2000 | 0.2 | 0.05 | 0.05 | 0.8 | 7.5 |
| C29 | 2000 | 0.5 | 0.05 | 0.05 | 0.8 | 7.5 |
| C30 | 2000 | 0.5 | 0.1 | 0.05 | 0.8 | 7.5 |
| C31 | 2000 | 0.5 | 0.05 | 0.1 | 0.8 | 7.5 |
| C32 | 2000 | 0.5 | 0.1 | 0.1 | 0.8 | 7.5 |
| C33 | 2000 | 5 | 2 | 1.1 | 0.8 | 7.5 |
| C34 | 2000 | 5 | 10 | 10 | 0.8 | 7.5 |
| C35 | 2000 | 5 | 11 | 1.1 | 0.8 | 7.5 |
| C36 | 2000 | 5 | 2 | 11 | 0.8 | 7.5 |

TABLE 4

| Condition | Magnetic flux density B8 value (T) | Iron loss W17/50 (W/kg) | Area ratio of peeling (%) | Al peak position D Al (μm) | Number density ND of Al oxides (/μm²) | S peak position DS (μm) | Evaluation | Remarks |
|---|---|---|---|---|---|---|---|---|
| C1 | 1.926 | 0.787 | 46 | 0.9 | 0.01 | 1.4 | C | Comp. ex. |
| C2 | 1.926 | 0.788 | 35 | 0.9 | 0.01 | 1.3 | C | Comp. ex. |
| C3 | 1.926 | 0.787 | 24 | 1.3 | 0.02 | 1.3 | C | Comp. ex. |
| C4 | 1.926 | 0.786 | 22 | 2 | 0.01 | 1.5 | C | Comp. ex. |
| C5 | 1.926 | 0.787 | 10 | 2 | 0.02 | 1.5 | B | Inv. ex. |
| C6 | 1.928 | 0.784 | 7 | 4.5 | 0.11 | 3.2 | B | Inv. ex. |
| C7 | 1.924 | 0.838 | 6 | 11.5 | 0.19 | 4.8 | B | Inv. ex. |
| C8 | 1.923 | 0.876 | 6 | 6.7 | 0.23 | 4.7 | C | Comp. ex. |
| C9 | 1.925 | 0.864 | 6 | 13.3 | 0.14 | 4.9 | C | Comp. ex. |
| C10 | 1.933 | 0.771 | 44 | 1.1 | 0.01 | 1.4 | C | Comp. ex. |
| C11 | 1.934 | 0.769 | 35 | 1.2 | 0.01 | 1.4 | C | Comp. ex. |

TABLE 4-continued

| Condition | Magnetic flux density B8 value (T) | Iron loss W17/50 (W/kg) | Area ratio of peeling (%) | Al peak position D Al (μm) | Number density ND of Al oxides (/μm$^2$) | S peak position DS (μm) | Evaluation | Remarks |
|---|---|---|---|---|---|---|---|---|
| C12 | 1.934 | 0.769 | 23 | 1.4 | 0.02 | 1.3 | C | Comp. ex. |
| C13 | 1.934 | 0.767 | 19 | 2 | 0.01 | 1.5 | C | Comp. ex. |
| C14 | 1.935 | 0.767 | 9 | 2 | 0.02 | 1.5 | A | Inv. ex. |
| C15 | 1.936 | 0.765 | 7 | 4.6 | 0.12 | 3.3 | A | Inv. ex. |
| C16 | 1.931 | 0.833 | 6 | 11.7 | 0.2 | 4.7 | A | Inv. ex. |
| C17 | 1.931 | 0.874 | 6 | 7.1 | 0.24 | 4.8 | C | Comp. ex. |
| C18 | 1.934 | 0.842 | 6 | 13.5 | 0.14 | 5 | C | Comp. ex. |
| C19 | 1.935 | 0.766 | 42 | 1.2 | 0.01 | 1.4 | C | Comp. ex. |
| C20 | 1.935 | 0.765 | 34 | 1.3 | 0.01 | 1.3 | C | Comp. ex. |
| C21 | 1.936 | 0.765 | 22 | 1.5 | 0.02 | 1.4 | C | Comp. ex. |
| C22 | 1.936 | 0.761 | 17 | 2 | 0.01 | 1.5 | C | Comp. ex. |
| C23 | 1.936 | 0.76 | 8 | 2 | 0.02 | 1.5 | A | Inv. ex. |
| C24 | 1.937 | 0.76 | 7 | 4.7 | 0.13 | 3.3 | A | Inv. ex. |
| C25 | 1.933 | 0.831 | 6 | 11.8 | 0.2 | 4.8 | A | Inv. ex. |
| C26 | 1.934 | 0.868 | 6 | 7.4 | 0.25 | 4.8 | C | Comp. ex. |
| C27 | 1.936 | 0.855 | 6 | 13.6 | 0.15 | 4.9 | C | Comp. ex. |
| C28 | 1.936 | 0.761 | 42 | 1.2 | 0.01 | 1.3 | C | Comp. ex. |
| C29 | 1.937 | 0.759 | 34 | 1.3 | 0.01 | 1.3 | C | Comp. ex. |
| C30 | 1.937 | 0.758 | 22 | 1.5 | 0.02 | 1.4 | C | Comp. ex. |
| C31 | 1.937 | 0.759 | 17 | 2 | 0.01 | 1.5 | C | Comp. ex. |
| C32 | 1.938 | 0.756 | 8 | 2 | 0.02 | 1.5 | A | Inv. ex. |
| C33 | 1.938 | 0.755 | 7 | 4.7 | 0.13 | 3.3 | A | Inv. ex. |
| C34 | 1.935 | 0.827 | 6 | 11.8 | 0.2 | 4.9 | A | Inv. ex. |
| C35 | 1.935 | 0.859 | 6 | 7.4 | 0.25 | 4.9 | C | Comp. ex. |
| C36 | 1.937 | 0.855 | 6 | 13.6 | 0.15 | 5 | C | Comp. ex. |

If referring to the results of Table 4, it was learned that grain-oriented electrical steel sheets satisfying the conditions of the present embodiment were judged as good.

Example 4

First, a steel ingot was prepared containing, by mass %, C: 0.08%, S: 0.025%, acid soluble Al: 0.03%, N: 0.008%, and Bi: 0.02% and having a balance of the contents of Si and Mn shown in Table 5 and Fe and impurities. The steel ingot was annealed at 1350° C. for 1 hour, then was hot rolled to thereby obtain a thickness 2.3 mm hot rolled steel sheet. The obtained hot rolled steel sheet was annealed at a peak temperature of 1100° C. for 140 seconds, pickled, then cold rolled to obtain a thickness 0.23 mm cold rolled steel sheet.

Next, the obtained cold rolled steel sheet was raised in temperature under conditions of an average rate of temperature rise Va1 between 25° C. and 550° C. of 300° C./s and an average rate of temperature rise Va2 between 550° C. and 700° C. of the conditions shown in Table 5, then was raised in temperature by an average rate of temperature rise Va3 between 700° C. and 850° C. of 100° C./s, then was annealed by primary recrystallization annealing in a wet hydrogen atmosphere at 850° C. for 180 seconds. Next, the surface of the steel sheet after the primary recrystallization annealing was coated with the annealing separator containing MgO in the state of the aqueous slurry and dried. The amount of deposition of the annealing separator on the surface of the steel sheet after drying was made 6 g/m$^2$ per side of the steel sheet. After that, the steel sheet was finish annealed and the steel sheet after the finish annealing was rinsed. Here, the contents of the annealing separator other than MgO were made to become the conditions shown in Table 5 when defining the content of MgO as 100% by mass % by adding a rare earth metal compound of Ce(OH)$_4$, an alkali earth metal compound of CaCO$_3$, and a sulfur (S)-containing compound of MgSO$_4$. The rate of release of moisture from the annealing separator between 25° C. and 700° C. in the process of temperature rise of the finish annealing was made 4.0%, the average rate of temperature rise between 25° C. and 700° C. in the process of temperature rise of the finish annealing was made 100° C./h, the average rate of temperature rise between 700° C. and 900° C. was made 15° C./h, the average rate of temperature rise Vf between 900° C. and 1100° C. was made the condition shown in Table 5, the average rate of temperature rise between 1100° C. and 1200° C. was made 15° C./h, and purification annealing was performed at 1200° C. for 20 hours. After that, the surface of the steel sheet was coated with an insulating coating having aluminum phosphate and colloidal silica as main ingredients, then flattening annealing was performed for the purpose of baking on the insulating coating and flattening the steel sheet.

Samples of the grain-oriented electrical steel sheet obtained by the above were cut and annealed to relieve stress, then the method of measurement of magnetic properties of single sheets of a sample size of 60 mm×300 mm (based on the method described in JIS C2556) was used to measure the value of the magnetic flux density B8 of the grain-oriented electrical steel sheets according to the invention examples and comparative examples. Here, the B8 value is the magnetic flux density of steel sheet when exciting grain-oriented electrical steel sheet at 50 Hz by 800 A/m. In the present invention, the average value of five samples was used.

Furthermore, samples of the grain-oriented electrical steel sheet were treated by laser to control the magnetic domains. The interval of firing in the longitudinal direction of the steel sheet was made 5 mm, the firing direction of the laser was made vertical to the longitudinal direction of the steel sheet, and the firing energy density Ua was made 2.0 mmJ/mm$^2$. The lasered samples were measured for iron loss $W_{17/50}$ using the method of measurement of magnetic properties of single sheets of a sample size of 60 mm×300 mm (based on the method described in HS C2556). Here, $W_{17/50}$ is the value of iron loss when exciting grain-oriented electrical steel sheet at 50 Hz to 1.7 T. In the present invention, the average value of five samples was used.

Furthermore, the above samples were cut into 30 mm widths and subjected to 10 mmφ flex tests. Here, three test pieces were tested by flex tests to find the average value of the area ratio of peeling. The test method was similar to Example 1.

Here, the steel sheets rinsed after the finish annealing were measured using glow discharge optical emission spectrometry (GDS method) for the Al peak position $D_{Al}$, the number density ND of Al oxides, and the S peak position $D_S$. The test method was similar to Example 3.

Furthermore, the contents of Si and Mn in the base metal steel sheet after the final process were analyzed by high frequency inductive coupling plasma emission spectroscopy. Further, the content of C in the base metal steel sheet after the final process was measured using a carbon/sulfur analyzer.

Here, conditions where the value of the magnetic flux density B8 of the grain-oriented electrical steel sheet was 1.92 T or more, the iron loss $W_{17/50}$ after laser control of the magnetic domains was 0.850 W/kg or less, the area ratio of peeling in a 10 mmφ flex test was 10% or less, the Al peak position $D_{Al}$ was present in a range of 2.0 to 12.0 μm, the number density ND of Al oxides was 0.02 to 0.20/μm², the S peak position $D_S$ was present in a range of 1.0 to 10.0 μm, and $D_S<D_{Al}$ were judged as good (B). Further, conditions where the conditions of B were satisfied and further the value of the magnetic flux density B8 was 1.93 T or more were judged as excellent (A). Further, conditions other than the above were judged as poor (C).

The manufacturing conditions, measurement results, and evaluations of the above invention examples and comparative examples are shown in Table 6. Furthermore, the contents of Si and Mn in the base metal steel sheet after the final process were described in Table 6. Further, the content of C in the base metal steel sheet after the final process was 0.003% in all samples described in Example 4 except for D5.

TABLE 5

| | Constituents in slab | | Average rate Va of temperature rise of | Annealing separator | | | | Average rate Vf of temperature |
|---|---|---|---|---|---|---|---|---|
| Condition | Si content (%) | Mn content (%) | primary recrystallization annealing (° C./s) | TiO₂ content (%) | Converted rare earth metal content (%) | Converted alkali earth metal content (%) | Converted S content (%) | rise of finish annealing (° C./h) |
| D1 | 2 | 0.1 | 1000 | 5 | 2 | 1.1 | 0.8 | 7.5 |
| D2 | 2.5 | 0.1 | 1000 | 5 | 2 | 1.1 | 0.8 | 7.5 |
| D3 | 3.3 | 0.1 | 1000 | 5 | 2 | 1.1 | 0.8 | 7.5 |
| D4 | 4.5 | 0.1 | 1000 | 5 | 2 | 1.1 | 0.8 | 7.5 |
| D5 | 5 | 0.1 | Not rollable | | | | | |
| D6 | 3.3 | <0.01 | 1000 | 5 | 2 | 1.1 | 0.8 | 7.5 |
| D7 | 3.3 | 0.01 | 1000 | 5 | 2 | 1.1 | 0.8 | 7.5 |
| D8 | 3.3 | 0.05 | 1000 | 5 | 2 | 1.1 | 0.8 | 7.5 |
| D9 | 3.3 | 0.15 | 1000 | 5 | 2 | 1.1 | 0.8 | 7.5 |
| D10 | 3.3 | 0.2 | 1000 | 5 | 2 | 1.1 | 0.8 | 7.5 |
| D11 | 2.5 | 0.1 | 200 | 5 | 2 | 1.1 | 0.8 | 7.5 |
| D12 | 2.5 | 0.1 | 400 | 5 | 2 | 1.1 | 0.8 | 7.5 |
| D13 | 2.5 | 0.1 | 700 | 5 | 2 | 1.1 | 0.8 | 7.5 |
| D14 | 2.5 | 0.1 | 2000 | 5 | 2 | 1.1 | 0.8 | 7.5 |
| D15 | 4.5 | 0.1 | 200 | 5 | 2 | 1.1 | 0.8 | 7.5 |
| D16 | 4.5 | 0.1 | 400 | 5 | 2 | 1.1 | 0.8 | 7.5 |
| D17 | 4.5 | 0.1 | 700 | 5 | 2 | 1.1 | 0.8 | 7.5 |
| D18 | 4.5 | 0.1 | 2000 | 5 | 2 | 1.1 | 0.8 | 7.5 |

TABLE 6

| Condition | Magnetic flux density B8 value (T) | Iron loss W17/50 (W/kg) | Area ratio of peeling (%) | Al peak position D Al (μm) | Number density ND of Al oxides (/μm²) | S peak position DS (μm) | Constituents after final process Si content (%) | Mn content (%) | Evaluation | Remarks |
|---|---|---|---|---|---|---|---|---|---|---|
| D1 | 1.945 | 0.863 | 7 | 4.7 | 0.13 | 3.4 | 1.9 | 0.1 | C | Comp. ex. |
| D2 | 1.94 | 0.814 | 6 | 4.8 | 0.14 | 3.3 | 2.4 | 0.1 | A | Inv. ex. |
| D3 | 1.937 | 0.76 | 7 | 4.8 | 0.13 | 3.3 | 3.2 | 0.1 | A | Inv. ex. |
| D4 | 1.932 | 0.737 | 7 | 4.9 | 0.13 | 3.4 | 4.4 | 0.1 | A | Inv. ex. |
| D5 | Not rollable | | | | | | | | C | Comp. ex. |
| D6 | 1.731 | 1.528 | 7 | 4.8 | 0.14 | 3.1 | 3.2 | <0.01 | C | Comp. ex. |
| D7 | 1.932 | 0.772 | 7 | 4.6 | 0.13 | 3.2 | 3.2 | 0.01 | A | Inv. ex. |
| D8 | 1.935 | 0.766 | 7 | 4.8 | 0.13 | 3.4 | 3.2 | 0.05 | A | Inv. ex. |
| D9 | 1.934 | 0.77 | 7 | 4.7 | 0.13 | 3.5 | 3.2 | 0.15 | A | Inv. ex. |
| D10 | 1.695 | 1.686 | 7 | 4.7 | 0.13 | 3.6 | 3.2 | 0.2 | C | Comp. ex. |
| D11 | 1.918 | 0.862 | 8 | 4.3 | 0.1 | 3.1 | 2.4 | 0.1 | C | Comp. ex. |
| D12 | 1.928 | 0.841 | 8 | 4.5 | 0.12 | 3.2 | 2.4 | 0.1 | B | Inv. ex. |
| D13 | 1.937 | 0.82 | 7 | 4.7 | 0.13 | 3.3 | 2.4 | 0.1 | A | Inv. ex. |
| D14 | 1.937 | 0.822 | 6 | 4.9 | 0.14 | 3.4 | 2.4 | 0.1 | A | Inv. ex. |
| D15 | 1.912 | 0.795 | 8 | 4.2 | 0.11 | 3.1 | 4.4 | 0.1 | C | Comp. ex. |
| D16 | 1.922 | 0.759 | 7 | 4.5 | 0.12 | 3.3 | 4.4 | 0.1 | B | Inv. ex. |

TABLE 6-continued

| Condition | Magnetic flux density B8 value (T) | Iron loss W17/50 (W/kg) | Area ratio of peeling (%) | Al peak position D Al (μm) | Number density ND of Al oxides (/μm²) | S peak position DS (μm) | Constituents after final process Si content (%) | Mn content (%) | Evaluation | Remarks |
|---|---|---|---|---|---|---|---|---|---|---|
| D17 | 1.931 | 0.737 | 7 | 4.7 | 0.13 | 3.3 | 4.4 | 0.1 | A | Inv. ex. |
| D18 | 1.933 | 0.733 | 6 | 4.8 | 0.15 | 3.4 | 4.4 | 0.1 | A | Inv. ex. |

If referring to the results of Table 6, it was learned that grain-oriented electrical steel sheets satisfying the conditions of the present embodiment were judged as good.

Example 5

First, a steel ingot was prepared containing, by mass %, C: 0.08%, Si: 3.3%, Mn: 0.08%, S: 0.024%, acid soluble Al: 0.03%, N: 0.009%, and Bi: 0.01% and having a balance of the constituents shown in Table 7 and Fe and impurities. The steel ingot was annealed at 1350° C. for 1 hour, then was hot rolled to thereby obtain a thickness 2.3 mm hot rolled steel sheet. The obtained hot rolled steel sheet was annealed at a peak temperature of 1100° C. for 140 seconds, pickled, then cold rolled to obtain a thickness 0.23 mm cold rolled steel sheet.

Next, the obtained cold rolled steel sheet was raised in temperature by an average rate of temperature rise Va1 between 25° C. and 550° C. of 50° C./s and an average rate of temperature rise Va2 between 550° C. and 700° C. of 1000° C./s, then was raised in temperature by an average rate of temperature rise Va3 between 700° C. to 850° C. of 100° C./s and was annealed by primary recrystallization annealing in a wet hydrogen atmosphere at 850° C. for 180 seconds. Next, the surface of the steel sheet after the primary recrystallization annealing was coated with the annealing separator containing MgO in the state of the aqueous slurry and dried. The amount of deposition of the annealing separator on the surface of the steel sheet after drying was made 8 g/m² per side of the steel sheet. After that, the steel sheet was finish annealed and the steel sheet after the finish annealing was rinsed. Here, the contents of the annealing separator other than MgO were a $TiO_2$ of 5%, $Y_2O_3$ converted to Y of 2%, $Sr(OH)_2$ converted to Sr of 1.1%, and $MgSO_4$ converted to S of 0.8% when defining the content of MgO as 100% by mass %. The rate of release of moisture from the annealing separator between 25° C. and 700° C. in the process of temperature rise of the finish annealing was made 2.0%, the average rate of temperature rise between 25° C. and 700° C. in the process of temperature rise of the finish annealing was made 100° C./h, the average rate of temperature rise between 700° C. and 900° C. was made 15° C./h, the average rate of temperature rise Vf between 900° C. and 1100° C. was made 7.5° C./h, the average rate of temperature rise between 1100° C. and 1200° C. was made 15° C./h, and purification annealing was performed at 1200° C. for 20 hours. After that, the surface of the steel sheet was coated with an insulating coating having aluminum phosphate and colloidal silica as main ingredients, then flattening annealing was performed for the purpose of baking on the insulating coating and flattening the steel sheet.

Samples of the grain-oriented electrical steel sheet obtained by the above were cut and annealed to relieve stress, then the method of measurement of magnetic properties of single sheets of a sample size of 60 mm×300 mm (based on the method described in JIS C2556) was used to measure the value of the magnetic flux density B8 of the grain-oriented electrical steel sheets according to the invention examples and comparative examples. Here, the B8 value is the magnetic flux density of steel sheet when exciting grain-oriented electrical steel sheet at 50 Hz by 800 A/m. In the present invention, the average value of five samples was used.

Furthermore, samples of the grain-oriented electrical steel sheet were treated by laser to control the magnetic domains. The interval of firing in the longitudinal direction of the steel sheet was made 5 mm, the firing direction of the laser was made vertical to the longitudinal direction of the steel sheet, and the firing energy density Ua was made 2.0 mmJ/mm². The lasered samples were measured for iron loss $W_{17/50}$ using the method of measurement of magnetic properties of single sheets of a sample size of 60 mm×300 mm (based on the method described in JIS C2556). Here, $W_{17/50}$ is the value of iron loss when exciting grain-oriented electrical steel sheet at 50 Hz to 1.7 T. In the present invention, the average value of five samples was used.

Furthermore, the above samples were cut into 30 mm widths and subjected to 10 mmφ flex tests. Here, three test pieces were tested by flex tests to find the average value of the area ratio of peeling. The test method was similar to Example 1.

Here, the steel sheets rinsed after the finish annealing were measured using glow discharge optical emission spectrometry (GDS method) for the Al peak position $D_{Al}$, the number density ND of Al oxides, and the S peak position $D_S$. The test method was similar to Example 3.

Furthermore, the contents of Cu, Sn, Ni, Cr, and Sb in the base metal steel sheet after the final process were analyzed by high frequency inductive coupling plasma emission spectroscopy.

It was confirmed that the contents of Cu, Sn, Ni, Cr, and Sb were the same as the values described in Table 7.

Here, conditions where the value of the magnetic flux density B8 of the grain-oriented electrical steel sheet was 1.92 T or more, the iron loss $W_{17/50}$ after laser control of the magnetic domains was 0.850 W/kg or less, the area ratio of peeling in a 10 mmφ flex test was 10% or less, the Al peak position $D_{Al}$ was present in a range of 2.0 to 12.0 μm, the number density ND of Al oxides was 0.02 to 0.20/μm², the S peak position $D_S$ was present in a range of 1.0 to 10.0 μm, and $D_S<D_{Al}$ were judged as good (B). Further, conditions where the conditions of B were satisfied and further the value of the magnetic flux density B8 was 1.93 T or more were judged as excellent (A). Further, conditions other than the above were judged as poor (C).

The manufacturing conditions, measurement results, and evaluations of the above invention examples and comparative examples are shown in Table 8. Furthermore, the contents of Si and Mn in the base metal steel sheet after the final process were analyzed by high frequency inductive coupling plasma emission spectroscopy. As a result, in all samples described in Example 5, the content of Si in the base metal steel sheet after the final process was 3.2% and the content of Mn in the base metal steel sheet after the final process was 0.08%. Further, the content of C in the base metal steel sheet after the final process was measured using a carbon/sulfur analyzer. As a result, in all samples described in Example 5, the content of carbon in the base metal steel sheet after the final process was 0.002%.

TABLE 7

| Condition | Constituents in slab | | | | |
|---|---|---|---|---|---|
| | Cu content (%) | Sn content (%) | Ni content (%) | Cr content (%) | Sb content (%) |
| E1 | 0.01 | 0 | 0 | 0 | 0 |
| E2 | 0.1 | 0 | 0 | 0 | 0 |
| E3 | 0.3 | 0 | 0 | 0 | 0 |
| E4 | 0 | 0.01 | 0 | 0 | 0 |
| E5 | 0 | 0.1 | 0 | 0 | 0 |
| E6 | 0 | 0.3 | 0 | 0 | 0 |
| E7 | 0 | 0 | 0.01 | 0 | 0 |
| E8 | 0 | 0 | 0.1 | 0 | 0 |
| E9 | 0 | 0 | 0.3 | 0 | 0 |
| E10 | 0 | 0 | 0 | 0.01 | 0 |
| E11 | 0 | 0 | 0 | 0.1 | 0 |
| E12 | 0 | 0 | 0 | 0.3 | 0 |
| E13 | 0 | 0 | 0 | 0 | 0.01 |
| E14 | 0 | 0 | 0 | 0 | 0.1 |
| E15 | 0 | 0 | 0 | 0 | 0.3 |
| E16 | 0.1 | 0.1 | 0 | 0 | 0 |
| E17 | 0.1 | 0 | 0.01 | 0.1 | 0 |
| E18 | 0 | 0.1 | 0 | 0 | 0.1 |
| E19 | 0 | 0 | 0 | 0.1 | 0.1 |
| E20 | 0.3 | 0.3 | 0.3 | 0.3 | 0.3 |

Example 6

First, a steel ingot containing, by mass %, C: 0.08%, Si: 3.2%, Mn: 0.08%, S: 0.025%, acid soluble Al: 0.03%, N: 0.008%, and Bi: 0.03% and having a balance comprised of Fe and impurities was prepared. The steel ingot was annealed at 1350° C. for 1 hour, then was hot rolled to obtain a thickness 2.3 mm hot rolled steel sheet. The obtained hot rolled steel sheet was annealed at a peak temperature of 1100° C. for 140 seconds, pickled, then cold rolled to obtain a thickness 0.23 mm cold rolled steel sheet.

Next, the obtained cold rolled steel sheet was raised in temperature under conditions of an average rate of temperature rise Va1 between 25° C. and 550° C., an average rate of temperature rise Va2 between 550° C. and 700° C., an average rate of temperature rise Va3 between 700° C. and an end of temperature rise, and the end temperature of temperature rise shown in Table 9, then annealed by primary recrystallization annealing in a wet hydrogen atmosphere at 850° C. for 180 seconds. Next, the surface of the steel sheet after the primary recrystallization annealing was coated with the annealing separator containing MgO in the state of the aqueous slurry and dried. The amount of deposition of the annealing separator on the surface of the steel sheet after drying was made 8 g/m$^2$ per side of the steel sheet. After that, the steel sheet was finish annealed and the steel sheet after the finish annealing was rinsed. Here, the contents of the annealing separator other than MgO were $TiO_2$ of 5%, $La_2O_3$ converted to La of 2%, and $CaSO_4.0.5H_2O$ of 3% when defining the content of MgO as 100% by mass %. The rate of release of moisture from the annealing separator

TABLE 8

| Condition | Magnetic flux density B8 value (T) | Iron loss W17/50 (W/kg) | Area ratio of peeling (%) | Al peak position D Al (μm) | Number density ND of Al oxides (/μm$^2$) | S peak position DS (μm) | Evaluation | Remarks |
|---|---|---|---|---|---|---|---|---|
| E1 | 1.945 | 0.741 | 6 | 4.8 | 0.13 | 3.4 | A | Inv. ex. |
| E2 | 1.946 | 0.738 | 7 | 4.7 | 0.13 | 3.3 | A | Inv. ex. |
| E3 | 1.946 | 0.737 | 7 | 4.8 | 0.13 | 3.3 | A | Inv. ex. |
| E4 | 1.947 | 0.736 | 7 | 4.8 | 0.12 | 3.4 | A | Inv. ex. |
| E5 | 1.949 | 0.731 | 7 | 4.6 | 0.1 | 3.2 | A | Inv. ex. |
| E6 | 1.95 | 0.729 | 7 | 4.5 | 0.09 | 3.2 | A | Inv. ex. |
| E7 | 1.944 | 0.744 | 7 | 4.8 | 0.13 | 3.3 | A | Inv. ex. |
| E8 | 1.945 | 0.741 | 7 | 4.8 | 0.13 | 3.4 | A | Inv. ex. |
| E9 | 1.945 | 0.742 | 7 | 4.7 | 0.13 | 3.4 | A | Inv. ex. |
| E10 | 1.944 | 0.743 | 7 | 4.7 | 0.12 | 3.3 | A | Inv. ex. |
| E11 | 1.944 | 0.744 | 7 | 4.8 | 0.13 | 3.4 | A | Inv. ex. |
| E12 | 1.945 | 0.741 | 7 | 4.8 | 0.13 | 3.3 | A | Inv. ex. |
| E13 | 1.951 | 0.727 | 7 | 4.7 | 0.13 | 3.4 | A | Inv. ex. |
| E14 | 1.953 | 0.723 | 8 | 4.3 | 0.08 | 3.2 | A | Inv. ex. |
| E15 | 1.953 | 0.722 | 8 | 4.2 | 0.07 | 3.2 | A | Inv. ex. |
| E16 | 1.95 | 0.728 | 7 | 4.8 | 0.13 | 3.3 | A | Inv. ex. |
| E17 | 1.946 | 0.739 | 7 | 4.7 | 0.13 | 3.3 | A | Inv. ex. |
| E18 | 1.957 | 0.712 | 8 | 4.3 | 0.08 | 3.2 | A | Inv. ex. |
| E19 | 1.953 | 0.722 | 8 | 4.2 | 0.07 | 3.2 | A | Inv. ex. |
| E20 | 1.958 | 0.708 | 9 | 4.1 | 0.05 | 3.2 | A | Inv. ex. |

Referring to the results of Table 8, it was learned that even if further including, by mass %, one or more of any of Cu: 0.01% or more and 0.30% or less, Sn: 0.01% or more and 0.30% or less, Ni: 0.01% or more and 0.30% or less, Cr: 0.01% or more and 0.30% or less, and Sb: 0.01% or more and 0.30% or less, the grain-oriented electrical steel sheet satisfying the conditions of the present embodiment was judged as excellent.

between 25° C. and 700° C. was made the conditions shown in Table 9 by adjusting the amount of water, aqueous slurry temperature, and stirring time in preparation of the aqueous slurry of the annealing separator and the drying temperature after coating the annealing separator. The average rate of temperature rise at 25° C. to 600° C. in the process of temperature rise of the finish annealing was made 100° C./h, the average rate of temperature rise at 600° C. to 900° C. was made 20° C./h, the average rate of temperature rise Vf at 900° C. to 1100° C. was made 7.5° C./h, the average rate of temperature rise at 1100° C. to 1200° C. was made 10° C./h, and purification annealing was performed at 1200° C. for 30 hours. After that, the surface of the steel sheet was coated with an insulating coating having aluminum phosphate and colloidal silica as main ingredients, flattening annealing was performed for the purpose of baking on the insulating coating and flattening the steel sheet.

Samples of the grain-oriented electrical steel sheet obtained by the above were cut and annealed to relieve stress, then the method of measurement of magnetic properties of single sheets of a sample size of 60 mm×300 mm (based on the method described in JIS C2556) was used to measure the value of the magnetic flux density B8 of the grain-oriented electrical steel sheets according to the invention examples and comparative examples. Here, the B8 value is the magnetic flux density of the steel sheet when exciting grain-oriented electrical steel sheet at 50 Hz by 800 A/m. In the present invention, the average value of five samples was used.

Furthermore, the sample was cut into 30 mm widths and subjected to 10 mmφ flex tests. Here, three test pieces were subjected to flex tests and the average value of the area ratios of peeling were found. The test method is similar to Example 1.

Here, a steel sheet rinsed after finish annealing was used to measure the Al peak position $D_{Al}$, the number density ND of Al oxides, and the S peak position $D_S$ by glow discharge optical emission spectrometry (GDS method). The test method is similar to Example 3.

Furthermore, the contents of Si and Mn in the base metal steel sheet after the final process were analyzed by high frequency inductive coupling plasma emission spectroscopy. Further, the content of C in the base metal steel sheet after the final process was measured using a carbon/sulfur analyzer.

Here, conditions where the value of the magnetic flux density B8 of the grain-oriented electrical steel sheet was 1.92 T or more, the area ratio of peeling in a 10 mmφ flex test was 10% or less, the Al peak position $D_{Al}$ was present in a range of 2.0 to 12.0 μm, the number density ND of Al oxides was 0.02 to 0.20/μm$^2$, the S peak position $D_S$ was present in a range of 1.0 to 10.0 μm, and $D_S<D_{Al}$ were judged as good (B). Further, conditions where the conditions of B were satisfied and further the value of the magnetic flux density B8 is 1.93 T or more were judged as excellent (A). Further, conditions other than the above were judged as poor (C).

The manufacturing conditions, measurement results, and evaluations of the above invention examples and comparative examples are shown in Table 9. Furthermore, the content of Si in the base metal steel sheet after the final process is 3.2% in all samples described in Table 9, the content of Mn is 0.08% in all of the samples described in Example 9, and the content of C is 0.003% in all of the samples of Example 9.

TABLE 9

| Condition | Average rate of temperature rise of primary recrystallization annealing | | | End temperature of temperature rise (° C.) | Rate of release of moisture from annealing separator (%) | Magnetic flux density B8 value (T) | Area ratio of peeling (%) | Al peak position D Al (μm) | Number density ND of Al oxides (/μm$^2$) | S peak position DS (μm) | Evaluation | Remarks |
| --- | --- | --- | --- | --- | --- | --- | --- | --- | --- | --- | --- | --- |
| | Va1 (° C./s) | Va2 (° C./s) | Va3 (° C./s) | | | | | | | | | |
| F1 | 400 | 400 | 400 | 850 | 0.3 | 1.908 | 6 | 3.8 | 0.06 | 1.8 | C | Comp. ex. |
| F2 | 400 | 400 | 400 | 850 | 0.5 | 1.926 | 6 | 4.2 | 0.08 | 2.9 | B | Inv. ex. |
| F3 | 400 | 400 | 400 | 850 | 1.0 | 1.926 | 6 | 4.3 | 0.09 | 3.0 | B | Inv. ex. |
| F4 | 400 | 400 | 400 | 850 | 3.0 | 1.928 | 6 | 4.5 | 0.11 | 3.2 | B | Inv. ex. |
| F5 | 400 | 400 | 400 | 850 | 5.0 | 1.928 | 6 | 4.6 | 0.12 | 3.3 | B | Inv. ex. |
| F6 | 400 | 400 | 400 | 850 | 6.0 | 1.926 | 6 | 4.8 | 0.12 | 3.4 | B | Inv. ex. |
| F7 | 400 | 400 | 400 | 850 | 7.0 | 1.911 | 8 | 5.5 | 0.14 | 3.7 | C | Comp. ex. |
| F8 | 700 | 700 | 400 | 850 | 0.3 | 1.908 | 6 | 3.8 | 0.06 | 1.8 | C | Comp. ex. |
| F9 | 700 | 700 | 400 | 850 | 0.5 | 1.931 | 6 | 4.4 | 0.09 | 2.9 | A | Inv. ex. |
| F10 | 700 | 700 | 400 | 850 | 1.0 | 1.933 | 6 | 4.5 | 0.11 | 3.1 | A | Inv. ex. |
| F11 | 700 | 700 | 400 | 850 | 3.0 | 1.934 | 6 | 4.6 | 0.12 | 3.3 | A | Inv. ex. |
| F12 | 700 | 700 | 400 | 850 | 5.0 | 1.934 | 6 | 4.7 | 0.12 | 3.3 | A | Inv. ex. |
| F13 | 700 | 700 | 400 | 850 | 6.0 | 1.931 | 6 | 4.8 | 0.13 | 3.4 | A | Inv. ex. |
| F14 | 700 | 700 | 400 | 850 | 7.0 | 1.913 | 8 | 5.6 | 0.15 | 3.8 | C | Comp. ex. |
| F15 | 1000 | 1000 | 400 | 850 | 0.3 | 1.906 | 6 | 3.9 | 0.07 | 1.9 | C | Comp. ex. |
| F16 | 1000 | 1000 | 400 | 850 | 0.5 | 1.932 | 6 | 4.5 | 0.11 | 3.0 | A | Inv. ex. |
| F17 | 1000 | 1000 | 400 | 850 | 1.0 | 1.934 | 6 | 4.6 | 0.12 | 3.2 | A | Inv. ex. |
| F18 | 1000 | 1000 | 400 | 850 | 3.0 | 1.934 | 6 | 4.8 | 0.13 | 3.3 | A | Inv. ex. |
| F19 | 1000 | 1000 | 400 | 850 | 5.0 | 1.934 | 6 | 4.8 | 0.13 | 3.3 | A | Inv. ex. |
| F20 | 1000 | 1000 | 400 | 850 | 6.0 | 1.932 | 6 | 4.9 | 0.13 | 3.5 | A | Inv. ex. |
| F21 | 1000 | 1000 | 400 | 850 | 7.0 | 1.905 | 8 | 5.8 | 0.16 | 3.8 | C | Comp. ex. |
| F22 | 2000 | 2000 | 400 | 850 | 0.3 | 1.901 | 6 | 3.9 | 0.07 | 1.9 | C | Comp. ex. |
| F23 | 2000 | 2000 | 400 | 850 | 0.5 | 1.931 | 6 | 4.6 | 0.12 | 3.1 | A | Inv. ex. |
| F24 | 2000 | 2000 | 400 | 850 | 1.0 | 1.936 | 6 | 4.7 | 0.12 | 3.3 | A | Inv. ex. |
| F25 | 2000 | 2000 | 400 | 850 | 3.0 | 1.936 | 6 | 4.8 | 0.13 | 3.3 | A | Inv. ex. |
| F26 | 2000 | 2000 | 400 | 850 | 5.0 | 1.936 | 6 | 4.8 | 0.13 | 3.4 | A | Inv. ex. |
| F27 | 2000 | 2000 | 400 | 850 | 6.0 | 1.933 | 6 | 4.9 | 0.13 | 3.5 | A | Inv. ex. |
| F28 | 2000 | 2000 | 400 | 850 | 7.0 | 1.902 | 8 | 5.9 | 0.16 | 3.9 | C | Comp. ex. |
| F29 | 100 | 100 | 100 | 850 | 3.0 | 1.908 | 6 | 4.4 | 0.11 | 3.1 | C | Comp. ex. |
| F30 | 400 | 700 | 400 | 850 | 3.0 | 1.933 | 6 | 4.8 | 0.13 | 3.3 | A | Inv. ex. |
| F31 | 1000 | 700 | 400 | 850 | 3.0 | 1.915 | 6 | 4.8 | 0.13 | 3.4 | C | Comp. ex. |
| F32 | 400 | 700 | 700 | 850 | 3.0 | 1.936 | 6 | 4.6 | 0.12 | 3.3 | A | Inv. ex. |
| F33 | 400 | 700 | 1000 | 850 | 3.0 | 1.907 | 8 | 5.7 | 0.16 | 1.9 | C | Comp. ex. |
| F34 | 1000 | 700 | 1000 | 850 | 3.0 | 1.904 | 8 | 5.8 | 0.16 | 1.9 | C | Comp. ex. |

TABLE 9-continued

| | Average rate of temperature rise of primary recrystallization annealing | | | End temperature of ture rise (° C.) | Rate of release of moisture from annealing separator (%) | Magnetic flux density B8 value (T) | Area ratio of peeling (%) | Al peak position D Al (μm) | Number density ND of Al oxides (/μm²) | S peak position DS (μm) | Evaluation | Remarks |
|---|---|---|---|---|---|---|---|---|---|---|---|---|
| Condition | Va1 (° C./s) | Va2 (° C./s) | Va3 (° C./s) | | | | | | | | | |
| F35 | 700 | 700 | 400 | 800 | 3.0 | 1.931 | 6 | 4.6 | 0.12 | 3.3 | A | Inv. ex. |
| F36 | 700 | 700 | 400 | 900 | 3.0 | 1.934 | 6 | 4.7 | 0.12 | 3.3 | A | Inv. ex. |

Referring to the results of Table 9, it was learned that the grain-oriented electrical steel sheets satisfying the conditions of the present embodiment were judged good.

Above, preferred embodiments of the present invention were explained in detail while referring to the attached drawings, but the present invention is not limited to these examples. A person having ordinary knowledge in the field of art to which the present invention belongs clearly could conceive of various changes or corrections within the range of the technical idea described in the claims. It will be understood that these naturally also fall in the technical scope of the present invention.

The invention claimed is:

1. A grain-oriented electrical steel sheet comprising a base metal steel sheet containing, by mass %, C: 0.005% or less, Si: 2.5 to 4.5%, and Mn: 0.01 to 0.15% and having a balance of Fe and impurities and a primary coating formed on a surface of the base metal steel sheet and containing $Mg_2SiO_4$ as a main constituent of the primary coating, in which grain-oriented electrical steel sheet, a peak position $D_{Al}$ of Al emission intensity obtained when analyzing the elements by glow discharge optical emission spectrometry from a surface of the primary coating in a thickness direction of the grain-oriented electrical steel sheet is present in a range from the surface of the primary coating to 2.0 to 12.0 μm in the thickness direction, a number density ND of Al oxides at the Al peak position $D_{Al}$ is 0.02 to 0.20/μm², a peak position $D_S$ of S emission intensity obtained when analyzing the elements by glow discharge optical emission spectrometry from a surface of the primary coating in a thickness direction of the grain-oriented electrical steel sheet is present in a range from the surface of the primary coating to 1.0 to 10.0 μm in the thickness direction, $D_S < D_{Al}$, and a value of the magnetic flux density B8 of the grain-oriented electrical steel sheet is 1.92T or more.

2. The grain-oriented electrical steel sheet according to claim 1, where the base metal steel sheet further contains, by mass %, one or more of Cu: 0.01% or more and 0.30% or less, Sn: 0.01% or more and 0.30% or less, Ni: 0.01% or more and 0.30% or less, Cr: 0.01% or more and 0.30% or less, or Sb: 0.01% or more and 0.30% or less.

3. A method for manufacturing the grain-oriented electrical steel sheet according to claim 1, comprising:

heating to 1280° C. or more and hot rolling a slab containing, by mass %, C: 0.02% or more and 0.10% or less, Si: 2.5% or more and 4.5% or less, Mn: 0.01% or more and 0.15% or less, a total of one or both of S and Se: 0.001% or more and 0.050% or less, acid soluble Al: 0.01% or more and 0.05% or less, N: 0.002% or more and 0.015% or less, and Bi: 0.0005% or more and 0.05% or less and having a balance of Fe and impurities so as to obtain a hot rolled steel sheet, annealing the hot rolled steel sheet followed by cold rolling one time or cold rolling two times or more wherein process annealing is interposed so as to obtain a cold rolled steel sheet, primary recrystallization annealing the cold rolled steel sheet, coating a surface of the cold rolled steel sheet after primary recrystallization annealing with an annealing separator containing MgO, then performing finish annealing to obtain a coated, annealed cold rolled steel sheet, and coating the coated, annealed cold rolled steel sheet after the finish annealing with an insulating coating, then performing flattening annealing, wherein in the primary recrystallization annealing, an average rate of temperature rise Va1 (° C./s) between a start of temperature rise and 550° C., an average rate of temperature rise Va2 (° C./s) between 550° C. and 700° C., and an average rate of temperature rise Va3 (C/s) between 700° C. and an end of temperature rise satisfy $Va1 \leq Va2, 400 \leq Va2, Va3 \leq Va2$, wherein the annealing separator contains by mass % based on a content of MgO in the annealing separator of 100%:

$TiO_2$: 0.5% or more and 10% or less, one or more of oxides, sulfides, sulfates, silicides, phosphates, hydroxides, carbonates, borides, chlorides, and fluorides of rare earth metals, converted to rare earth metals: 0.1% or more and 10% or less, one or more of sulfates, carbonates, hydroxides, chlorides, and oxides of alkali earth metals, wherein the alkali earth metals are selected from a group comprised of Ca, Sr, and Ba, converted to alkali earth metals: 0.1% or more and 10% or less, sulfates or sulfides, converted to sulfur element: A %, wherein A satisfies $(0.00025 \times Va2) \leq A \leq 1.5$ wherein in the finish annealing, a rate of release of moisture from the annealing separator from room temperature to 700° C. is 0.5% or more and 6.0% or less, and an average rate of temperature rise Vf (° C./h) from 900° C. to 1100° C. satisfies:

$5 \leq Vf \leq (21 - 4 \times A)$.

\* \* \* \* \*